United States Patent [19]
Ansell et al.

[11] Patent Number: 6,151,631
[45] Date of Patent: Nov. 21, 2000

[54] TERRITORIAL DETERMINATION OF REMOTE COMPUTER LOCATION IN A WIDE AREA NETWORK FOR CONDITIONAL DELIVERY OF DIGITIZED PRODUCTS

[75] Inventors: Steven T. Ansell, Fremont; Andrew R. Cherenson, Los Altos, both of Calif.

[73] Assignee: Liquid Audio Inc., Redwood City, Calif.

[21] Appl. No.: 09/173,369

[22] Filed: Oct. 15, 1998

[51] Int. Cl.⁷ .................................................... G06F 15/16
[52] U.S. Cl. ........................ 709/229; 709/203; 709/217; 709/219; 709/225
[58] Field of Search ................................. 709/203, 217, 709/225, 229, 219

[56] References Cited

U.S. PATENT DOCUMENTS

| | | | |
|---|---|---|---|
| 5,418,713 | 5/1995 | Allen ........................................ | 364/403 |
| 5,421,024 | 5/1995 | Faulk, Jr. et al. ....................... | 709/223 |
| 5,636,276 | 6/1997 | Brugger .................................... | 380/4 |
| 5,734,823 | 3/1998 | Saigh et al. ........................ | 395/200.06 |
| 5,734,891 | 3/1998 | Saigh ......................................... | 395/610 |
| 5,777,989 | 7/1998 | McGarvey ............................... | 370/254 |
| 5,794,217 | 8/1998 | Allen ......................................... | 705/27 |
| 5,930,474 | 7/1999 | Dunworth et al. ....................... | 707/10 |
| 5,937,163 | 8/1999 | Lee et al. ................................. | 345/356 |
| 5,944,790 | 8/1999 | Levy ......................................... | 709/218 |

*Primary Examiner*—Zarni Maung
*Assistant Examiner*—Saleh Najjar
*Attorney, Agent, or Firm*—James D. Ivey, Esq.

[57] ABSTRACT

Digital products are delivered to a client computer through a wide area network such as the Internet only upon determination that the client computer is located in a geopolitical territory, such as a country or state, for which delivery of the digital product is authorized. A server computer estimates the geopolitical location of the client computer from the client computer's network address through contact information in a network address allocation database. Alternatively, the server computer estimates the geopolitical location of the client computer from the client computer's custom name, e.g., domain name. The domain name itself can specify a country within which the client computer is located. Such can be conventional or can be parse according to ad hoc patterns developed by large, international organizations identified by a root domain name. In addition, contact information for the domain name can be retrieved and geopolitical territory information parsed from the contact information. A super-classification of the domain name can indicate a geopolitical territory. Records associating geopolitical territories with network address ranges are stored in such a manner that maximizes resolution within a cache of such records, perhaps at the expense of reduce efficiency but so as to maximum currency and accuracy.

15 Claims, 16 Drawing Sheets

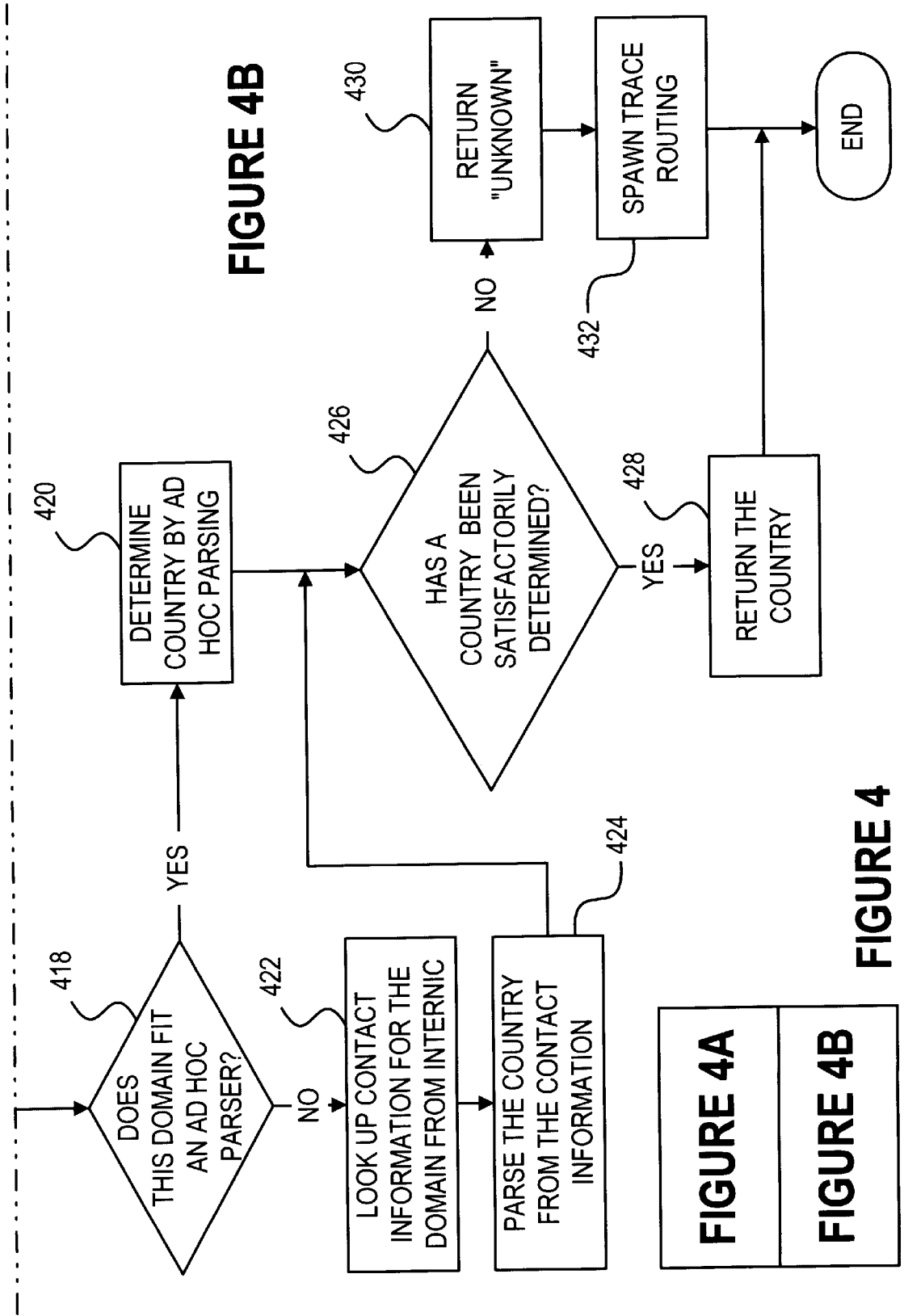

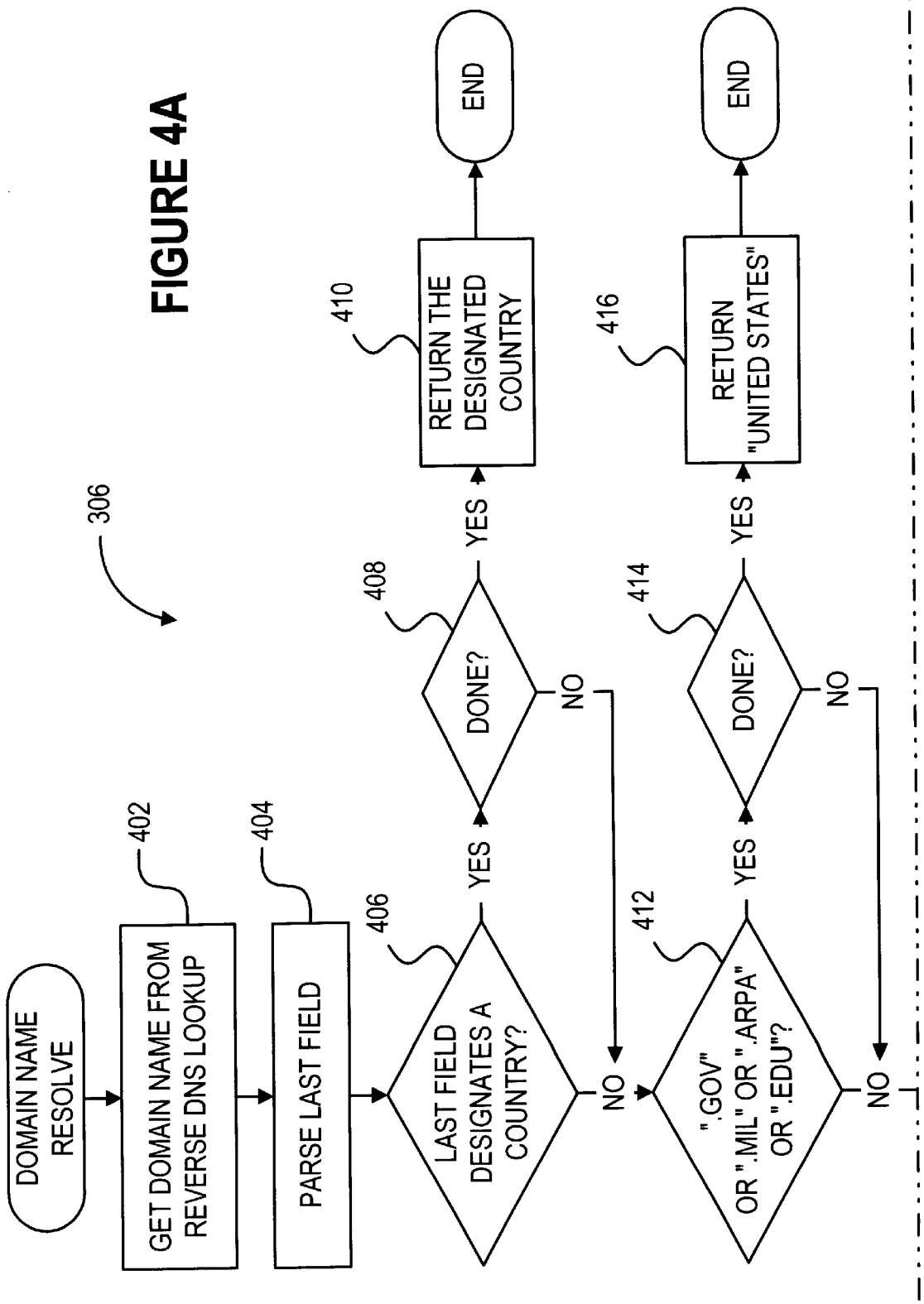

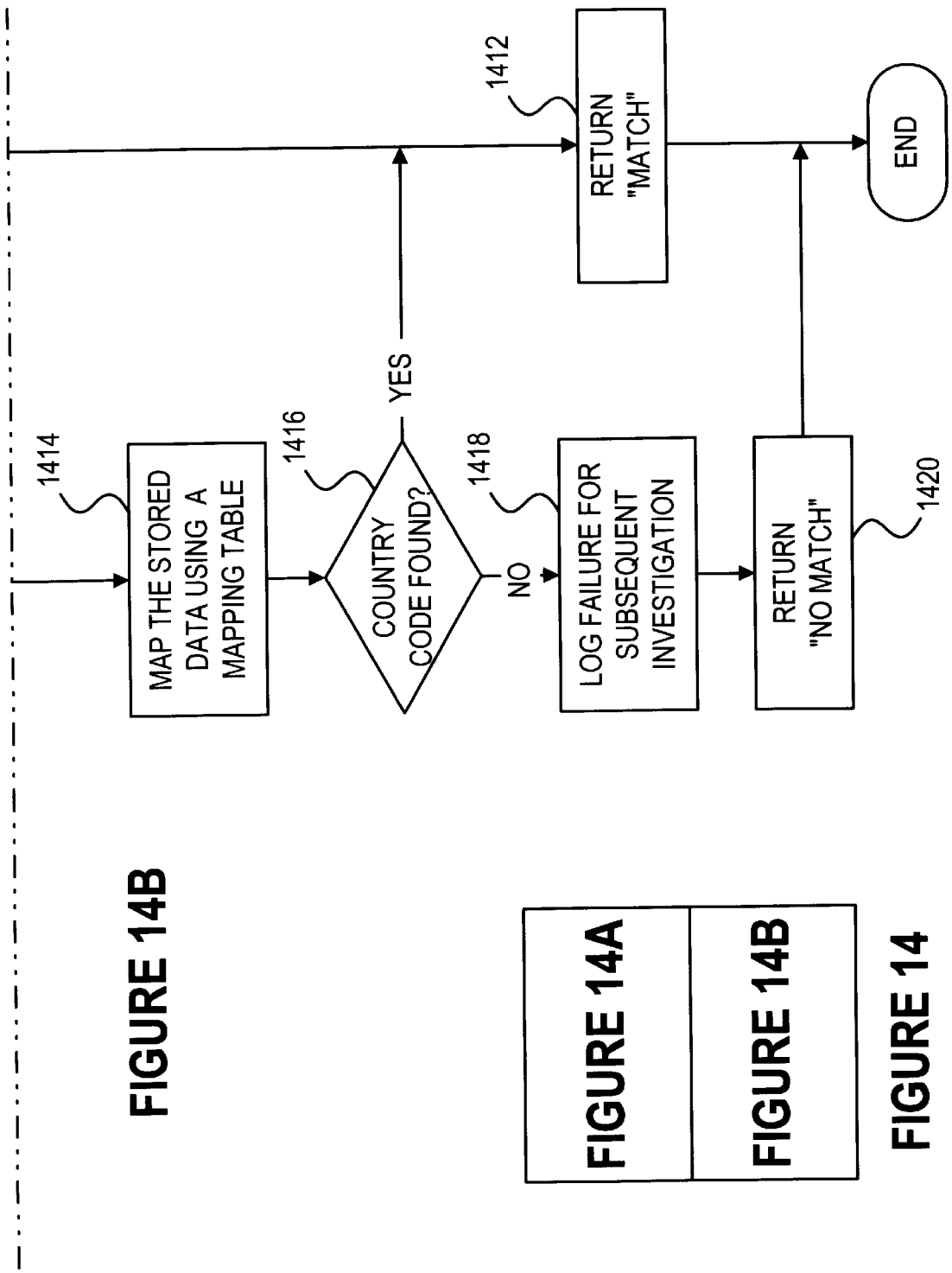

TERRITORIAL DETERMINATION OF REMOTE COMPUTER LOCATION IN A WIDE AREA NETWORK FOR CONDITIONAL DELIVERY OF DIGITIZED PRODUCTS

FIELD OF THE INVENTION

The present invention relates to computer networks and, in particular, to a particularly efficient mechanism for determining a geopolitical territory in which a computer of a wide area computer network is located.

BACKGROUND OF THE INVENTION

Wide area computer networks, such as the Internet, have grown to transcend national boundaries such that data are easily passed from one nation to another. The international nature of the Internet has posed some problems. First, laws passed by one country with access to the Internet effectively limits content available to all other countries through the Internet to a "least common denominator," i.e., to content which is legal in all countries which have access to the Internet. For example, one state might prohibit certain types of advertising, e.g., for legal services, such that a page on the World Wide Web for legal services in another state can violate that prohibition since the page is available in generally all of the United States. As another example, one country might have very strict decency laws prohibiting distribution of material which is generally acceptable in other countries. Distribution of such material in these other countries through the Internet can potentially violate the strict decency laws in the first country.

A second problem is that providers of digital products sold and/or distributed through the Internet are generally limited to world-wide distribution notwithstanding cultural, demographic, and legal issues which can make world-wide distribution provided by the Internet unattractive while the immediacy and convenience of distribution through the Internet is still important.

What is therefore needed is a mechanism by which digital products can be distributed through wide area networks such as the Internet while overcoming the disadvantages mentioned above.

SUMMARY OF THE INVENTION

In accordance with the present invention, delivery of digital products to a client computer through a wide area network is conditioned upon which geopolitical territory within which the client computer is located. A digital product is generally any type of data stored digitally which has value including, for example, computer software, data records from databases, and multimedia content such as digitized audio, video, and/or graphical images. In general, a server computer receives a request for the digital product and, in response to the request, determines within which geopolitical territory the client computer is located. The server computer compares the geopolitical location of the client computer to a list of geopolitical territories for which the requested digital product is available. The digital product is delivered to the client computer only If the client computer is located in a geopolitical territory for which the requested digital product is available.

Restriction of such international flow of computer data in accordance with the present invention is desirable for a number of reasons including, e.g., export control, import control, and marketing and business advantage. For export control, it is desirable to restrict exportation of information which is deemed import for a nation's security. A controversial example of such information is computer software with particularly effective cryptography. In accordance with the present invention, a distributor of cryptography software can restrict delivery through the Internet to computers located in the United States, thereby complying with United States export restrictions.

For import control, ability to restrict digital product delivery according to geopolitical territory could justify holding sponsors of server computer systems liable for delivering material to a particular jurisdiction which is contraband in that jurisdiction. Such is particularly vital to the free use of such wide area networks. Without such a geopolitical restriction, laws passed by one country with access to the wide area network effectively limits content available to all other countries through the wide area network to a "least common denominator," i.e., to content which is legal in all countries which have access to the wide area network.

For business and marketing advantage, geopolitical restriction of data flow allows commercial products which are capable of transmission through computer network media to be marketed and distributed in individual geopolitical territories independently of other geopolitical territories. For example, computer software can be marketed to countries based upon the human languages spoken in such countries, e.g., English language word processing software can be distributed to the United States, Canada, the United Kingdom, Australia, New Zealand, and others while Japanese language word processors could be marketed and distributed in Japan. As another example, release of digitized multimedia content can be timed to coincide with events such as musical tours and motion picture releases. In addition, business advantage would be realized if commerce conducted through such a wide area network as the Internet could charge different prices for different geopolitical territories to more effectively compete with products available locally, i.e., not through a wide area computer network.

Currently, some sites on the World Wide Web of the Internet estimate a user's location geographically and display the user's position on a world map. The location is geographical in that the position is estimated in terms of latitudinal and longitudinal coordinates. The primary value of such sites appears to be entertainment and, accordingly, accuracy is not essential. In addition, curiosity of a user visiting such a site can justify long periods of time during which the user's geographical location is determined. In addition, such sites are generally primarily concerned with geographical location and therefore employ mechanisms which can ignore geopolitical boundaries such as national borders.

In a financial transaction carried out on a wide area network, determination with respect to a particular user's geopolitical territory is merely ancillary to the transaction. Accordingly, time is of the essence in making such a determination. In addition, geopolitical territory, e.g., national borders, are all that is important and geographical location within such territories is irrelevant.

One conventional mechanism for determining geographical position is trace routing. In trace routing, geographical location of a computer in question is estimated by sending a packet to the computer in question. As the packet is routed to the computer in question, the packet sends status packets back to the sender. The status packets include information regarding at which routing node the original packet is sent.

From the route taken by the original packet, the approximate geographical location of the computer in question is estimated.

Trace routing is too inefficient for inquiries which are ancillary to a commercial transaction. It may take several seconds to several minutes to estimate a geographical location. In a typical commercial transaction, consumers will be loath to wait an additional few minutes while geographical location is estimated. In addition, trace routing can be exceedingly complex to implement in properly handling failure conditions, e.g., to properly interpret paths taken by lost packets.

In accordance with the present invention, efficient mechanisms are employed to estimate the geopolitical location of the client computer. In particular, allocation information is retrieved from an allocation database according to a network address of the client computer. For example, the IP address of the client computer is used to retrieve information regarding the entity to which the IP address is allocated from an allocation database such as the ARIN, RIPE, and APNIC allocation databases. The allocation information includes contact information which is parsed to determine a geopolitical territory, e.g., a country, within which the client computer is located.

Further in accordance with the present invention, a domain name for the client computer is used to estimate a geopolitical location if the allocation information is not determinative. The domain name is retrieved according to the IP address of the client computer through a reverse domain name server (DNS) query.

The domain name itself can specify a geopolitical territory and, if so, the specification is used to estimate the geopolitical location of the client computer. For example, the domain name "www.domain.co.se" includes the country designation ".se" identifying Sweden as the geopolitical territory to which the domain name is allocated.

A classification specified in the domain name can suggest a geopolitical territory. For example, essentially all domain names with classification specifications of ".mil," ".gov," and ".arpa" are allocated within the United States. Most domain names with classification specifications of ".edu" are also allocated within the United States.

Some domain names are allocated to large, international organizations. Some of these organizations include geopolitical designations within the domain according to one of a number of particular, predictable patterns. These patterns are often specific to individual organizations and are not standardized. Accordingly, ad hoc parsing according to these patterns can provide an accurate determination with respect to the geopolitical location of the client computer. Such an organization can generally be identified by a root domain name. For each root domain name, a number of patterns are stored. In evaluating a particular domain name, each pattern for the corresponding root domain name is compared to the domain name. If a pattern matches, the domain name is parsed according to the pattern to extract the geopolitical designation of the domain name. Since such geopolitical domain names may not be standardized, each root domain name is associated with a mapping table which maps geopolitical designations of a particular organization to a standard set of geopolitical designations.

Further in accordance with the present invention, geopolitical locations associated with various ranges of network addresses are cached to obviate redundant processing. Typically, caching involves a preference for consolidating records to represent larger ranges of network addresses, e.g., for storage and searching efficiency. However, the manner in which network addresses, e.g., IP addresses, are typically allocated makes such consolidation undesirable. In particular, large blocks of collectively allocated network addresses are typically subsequently subdivided into smaller blocks which are then collectively re-allocated. Therefore, smaller ranges of network addresses, while generally requiring more storage and searching than larger ranges, are more current and more accurate.

Accordingly, new records are reconciled with previously stored records in such a manner that maximizes currency and accuracy of geopolitical locations stored in the cache. For example, if the new record covers only a portion of a previously stored record, the new record is stored in the cache and the previously stored record is modified to cover only those network addresses not covered by the new record. Such is appropriate since the new record likely represents a subsequent subdivision of the previously stored record. Similarly, if the new record covers all of the network addresses of a previously stored record and covers additional network address, only the new record is modified to cover only those network addresses not covered by the previously stored record and is cached as modified. The previously stored record remains unmodified in the cache. Such is appropriate since the previously stored record likely represents a subsequent subdivision of the network addresses represented by the new record and is therefore likely to be more current and accurate that the overlapping portions of the new record.

BRIEF DESCRIPTION OF THE DRAWINGS

FIG. 4 is a logic flow diagram illustrating a portion of the processing by the territorial restriction server of FIG. 1 in greater detail.

DETAILED DESCRIPTION

Figure 6:
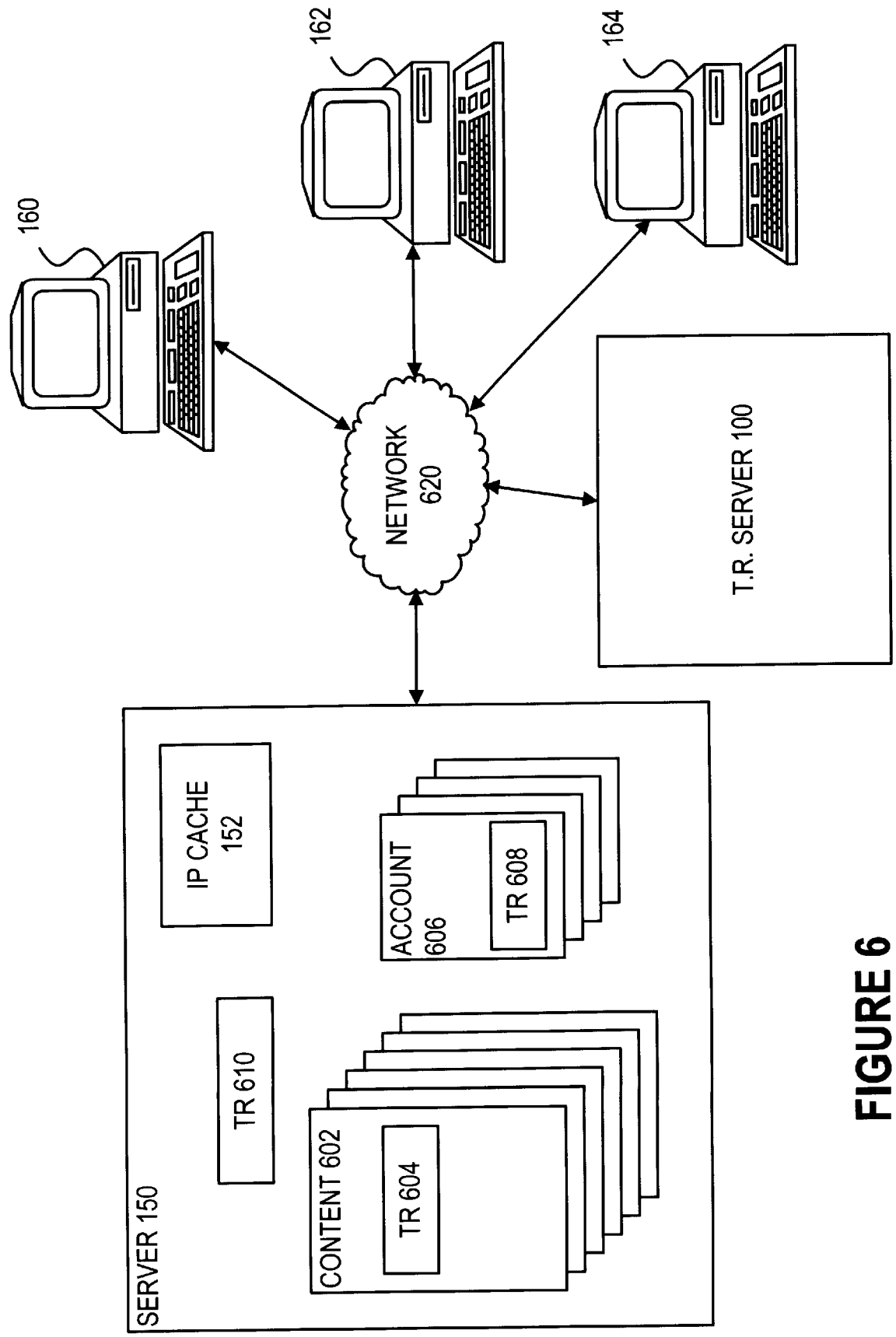
FIG. 6 is a block diagram of the computer system of FIG. 1 showing the server computer in greater detail.

In accordance with the present invention, a server computer 150 (FIG. 1) conditionally sends a digital product to client computer 160 depending upon the geopolitical location of client computer 160. As used herein, the geopolitical location of a computer, such as client computer 160, is the geopolitical territory within which the computer is located. A territorial restriction (TR) server 100 determines a geopolitical territory within which client computer 160 is located by reference to a network address of client computer 160. Client computer 160, server computer 150, and TR server 100 are coupled to one another through a wide area network 620 (FIG. 6). In one embodiment, the wide area network is the Internet and the network address is an Internet protocol (IP) address. TR server 100 (FIG. 1) attempts to determine the geopolitical territory of client computer 160 by reference to allocation databases and to custom name databases. In this illustrative embodiment, allocation databases include the ARIN allocation database shown as database 114 and RIPE and APNIC allocation databases shown collectively as database 110, and custom name databases include domain name servers (DNS) such as DNS database 116 and INTERNIC database 112.

Allocation databases 110 and 114 store information specifying to what entity various IP addresses are allocated. Records within allocation databases 110 and 114 include contact information, i.e., information specifying means by which the entity can be contacted—for example, by mail or by telephone—which can be parsed to identify a particular geopolitical territory. In one embodiment, database 110 is mirrored locally, i.e., an equivalent database is stored locally within TR server 100, for more efficient access. RIPE and APNIC allocation databases allow local mirroring and such is conventional and known. DNS database 116 stores data associating IP addresses with custom domain names. INTERNIC database 112 stores contact information for such domain names and the contact information can be parsed to identify a particular geopolitical territory. As described more completely below, TR server 100 accumulates geopolitical location information for various IP addresses in an IP address block cache 104 to expedite and simplify determination of a particular computer's geopolitical location.

Figure 1:
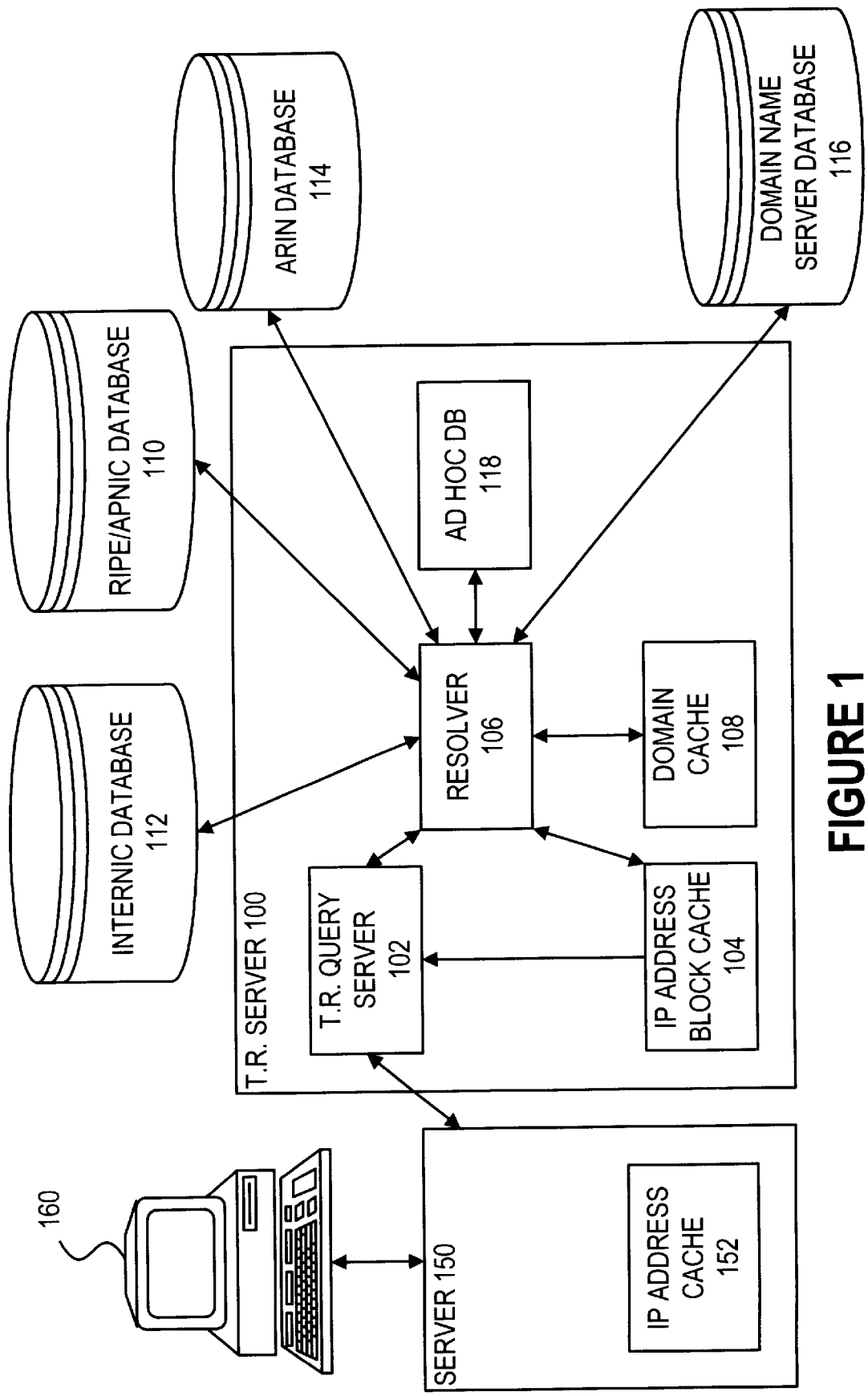
FIG. 1 is a block diagram of a computer system which includes a client computer, a server computer, and a territorial restriction server in accordance with the present invention.
Figure 2:
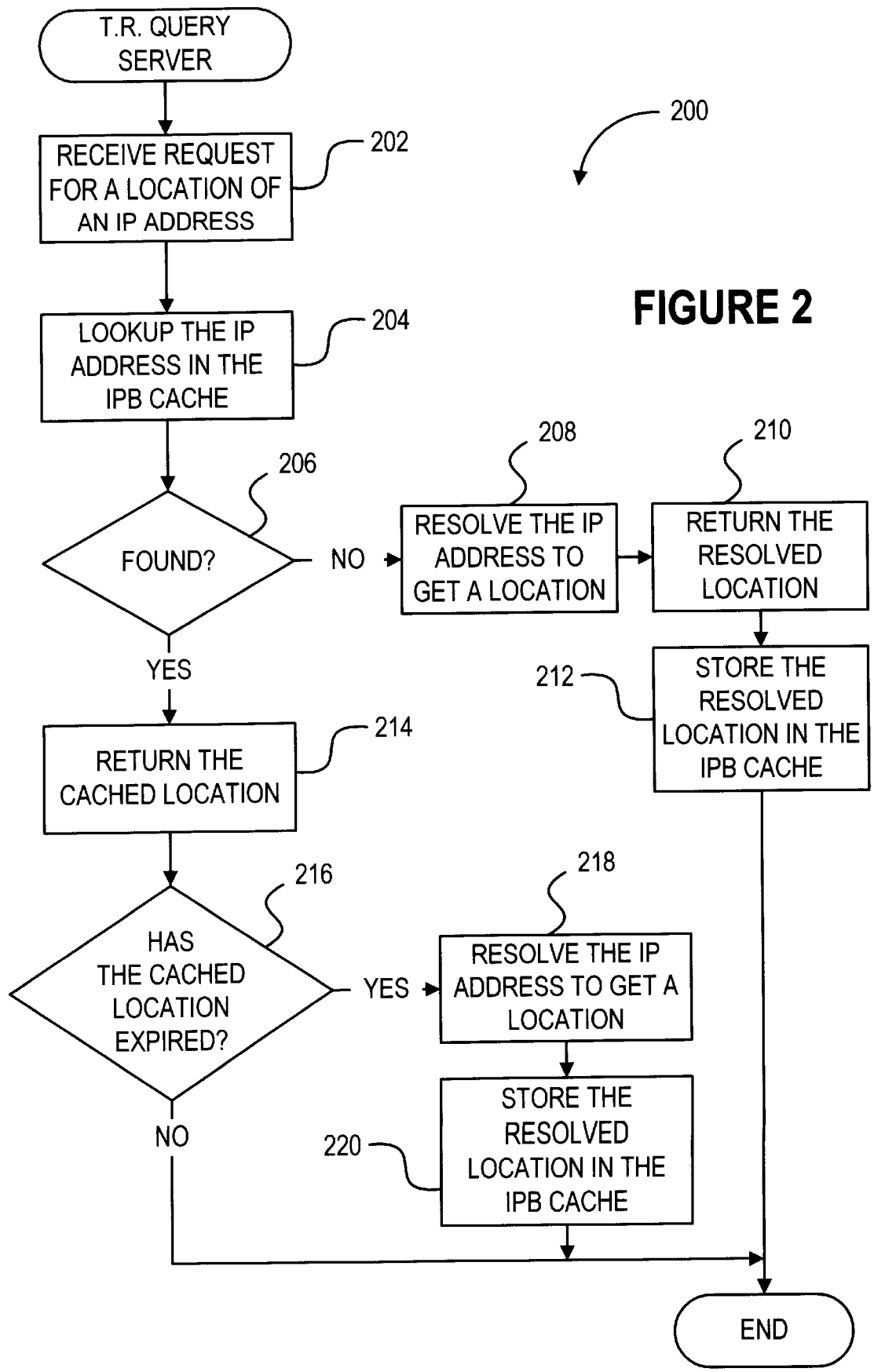
FIG. 2 is a logic flow diagram illustrating processing by the territorial restriction server of FIG. 1.

In general, TR server 100 receives an inquiry from a server computer 150 regarding the geopolitical location of a client computer 160. Alternatively, client computer 160 can submit such an inquiry to TR server 100 directly. Processing by TR server 100 in response to such a request is illustrated by logic flow diagram 200 (FIG. 2) in which processing begins with receipt of the inquiry in step 202 by a TR query server 102 (FIG. 1). The inquiry includes an IP address of the computer whose geopolitical location is to be determined, e.g., the IP address of client computer 160 in this illustrative example. The IP address of the inquiry is referred to herein as the subject IP address.

In step 204 (FIG. 2), TR query server 102 (FIG. 1) retrieves a geopolitical location associated with the subject IP address from IP address block cache 104. IP address block cache 104 includes IP address block cache (IPABC) records such as IPABC record 1102 (FIG. 11) which includes data fields which specify an IP address range 1104, a geopolitical location 1106, an expiration time 1108, and an information source 1110. In test step 206 (FIG. 2), TR query server 102 (FIG. 1) determines whether a valid IPABC record, i.e., one in which IP address range 1104 (FIG. 11) includes the subject IP address, is retrieved.

If a valid IPABC record is not retrieved, processing transfers to step 208 (FIG. 2) in which TR query server 102 (FIG. 1) causes a resolver 106 to determine the geopolitical location of the subject IP address, e.g., of client computer 160. The manner in which resolver 106 makes such a determination is described more completely below. In step 210 (FIG. 2), TR query server 102 (FIG. 1) returns to the source of the inquiry the geopolitical location determined by resolver 106. In step 212 (FIG. 2), resolver 106 (FIG. 1) stores the determined geopolitical location in IP address block cache 104 to expedite subsequent inquiries for the same or similar IP addresses.

If, in test step 206 (FIG. 2), TR query server 102 (FIG. 1) determines that a valid IPABC record is retrieved, processing transfers to step 212 (FIG. 2) in which TR query server 102 (FIG. 1) returns to the source of the inquiry the geopolitical location retrieved from IP address block cache 104. Only after the geopolitical location retrieved from IP address block cache 104 has been returned as the determined geopolitical location is the IPABC record retrieved from IP address block cache 104 checked for currency. In test step 216 (FIG. 2), TR query server 102 (FIG. 1) determines whether the retrieved record has expired, e.g., by comparison of data stored as expiration time 1108 (FIG. 11) to data representing the current time. If the retrieved record has not expired, processing according to logic flow diagram 200 (FIG. 2) completes and the geopolitical location of client computer 160 (FIG. 1) is efficiently determined. Conversely, if the retrieved record has expired, processing transfers to step 218 (FIG. 2) in which TR query server 102 (FIG. 1) causes resolver 106 to determine the geopolitical location of the subject IP address, e.g., of client computer 160. In step 220 (FIG. 2), the geopolitical location determined by resolver 106 is stored in a new IPABC record which is stored in IP address block cache 104 (FIG. 1).

Resolver 106

As described briefly above, resolver 106 determines a geopolitical location of client computer 160 by reference to the IP address of client computer 160, i.e., the subject IP address.

Briefly, as used herein, a geopolitical territory is a territory defined by geopolitical boundaries. For example, geopolitical territories can include specific continents, countries, regions within countries, and collections of countries. Continents can include, for example, Europe, Africa, and Asia. Countries can include the United States, Sweden, Korea, etc. Regions within countries can include individual states of the United States and Canadian provinces for example. Countries can be grouped to form collections of countries, e.g., the United Kingdom, Western Europe, OPEC, etc.

The location of client computer 160 is geopolitical in that the geographical location of client computer 160 is only important to the extent the geographical location determines which laws apply to the use of client computer 160 and/or the nature of data for which access is authorized. For example, if the geopolitical territories of concern are countries, distinction between Honolulu, Hi. of the United States and Freeport, Me. of the United States is unnecessary notwithstanding geographical separation of several thousand miles. Conversely, distinction between Seattle, Wash. in the United States and Vancouver, British Columbia in Canada is important while the two geographical locations are just a few score miles from one another.

Figure 3:
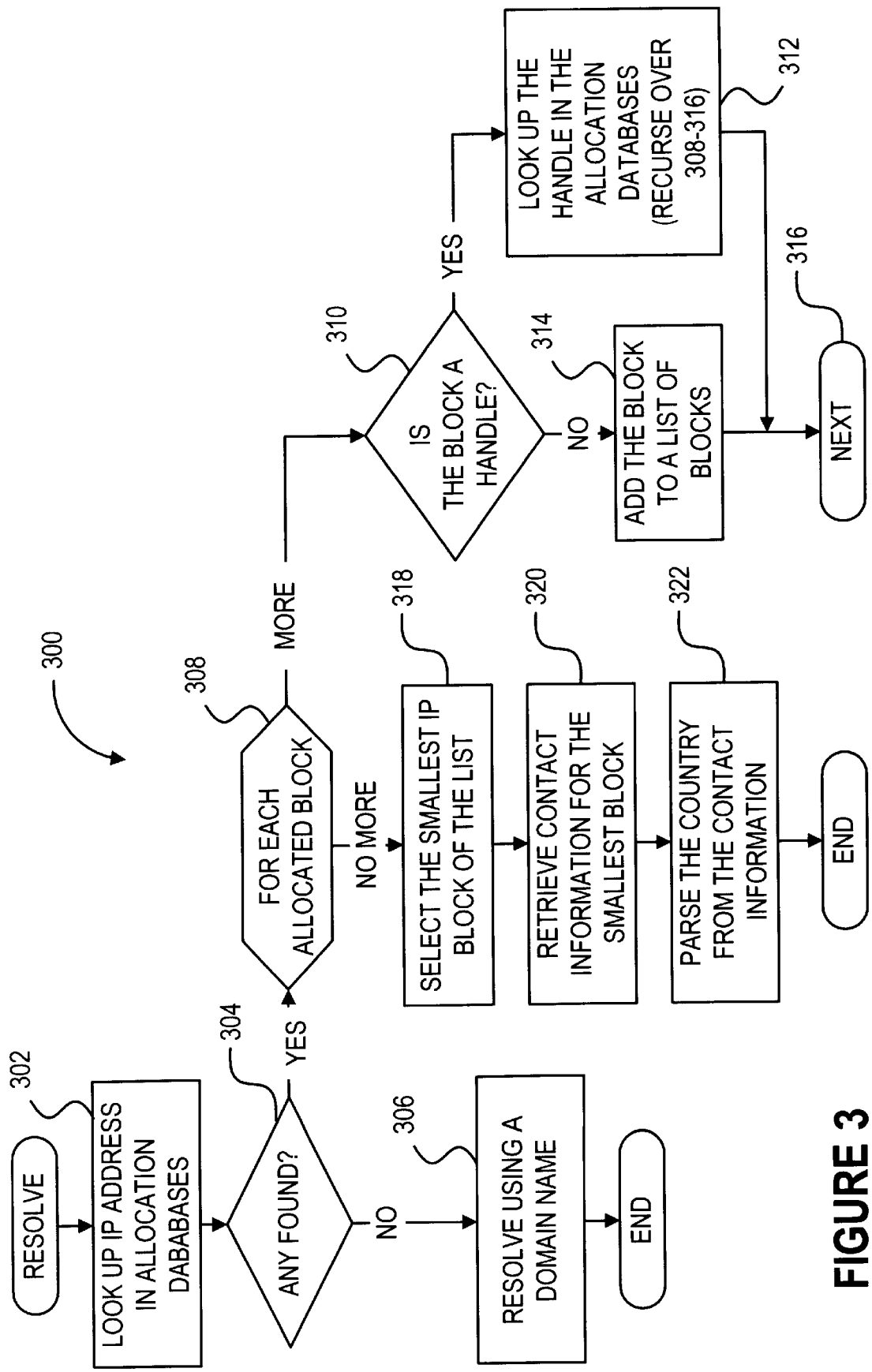
FIG. 3 is a logic flow diagram illustrating a portion of the processing by the territorial restriction server of FIG. 1 in greater detail.

Determination by resolver 106 of a geopolitical location from the subject IP address, e.g., the IP address of client computer 160, as performed in steps 208 (FIG. 2) and 218 is illustrated in logic flow diagram 300 (FIG. 3). In step 302, resolver 106 (FIG. 1) retrieves any and all records pertaining to allocation of the subject IP address from allocation databases 110 and 114. Retrieval of such records is conventional and known. Briefly, the subject IP address is supplied in the query and zero or more records are returned, each of which provides allocation information for a range of IP addresses which includes the subject IP address or, alternatively, is a handle. A handle is data which is accepted by allocation databases 110 and 114 as an IP address for additional queries and can return additional allocation records.

If no records are returned by allocation databases 110 and 114, processing transfers through test step 304 (FIG. 3) to step 306 in which resolver 106 (FIG. 1) determines a geopolitical location using a custom domain name in a manner described more completely below and processing according to logic flow diagram 300 (FIG. 3) completes. Conversely, if one or more records are returned by allocation databases 110 (FIG. 1) and 114, processing transfers through test step 304 (FIG. 3) to loop step 308.

Loop step 308 and next step 316 define a loop in which each IP address allocation record returned by allocation databases 110 (FIG. 1) and 114 is processed according to steps 310–314 (FIG. 3). During each iteration of the loop of steps 308–316, the IP address allocation record processed according to steps 310–314 is referred to as the subject allocation record. The structure of IP address allocation records is known and is not described herein.

In test step 310, resolver 106 (FIG. 1) determines if the subject allocation record is a handle. If so, resolver 106 queries the one of allocation databases 110 and 114 from which the handle was received for IP address allocation records corresponding to the handle in step 312 (FIG. 3). In particular, step 312 is a recursive execution of steps 308–316. Conversely, if the subject allocation record is not a handle, resolver 106 (FIG. 1) adds the subject allocation record to a list of IP address allocation records. Prior to performance of the steps of logic flow diagram 300 (FIG. 3), the list is initialized to contain no allocation records. After either step 312 or step 314, processing transfers through next step 316 to loop step 308 in which the next IP address allocation record is processed.

When all IP address allocation records pertaining to the subject IP address have been processed according to the loop of steps 308–316, the list of allocation records contains all IP address allocation records from allocation databases 110 (FIG. 1) and 114 associated, directly or indirectly, with the subject IP address and processing transfers to step 318 (FIG. 3).

In step 318, resolver 106 (FIG. 1) selects the allocation record of the list of allocation records corresponding to the smallest range of IP addresses, i.e., which includes the fewest IP addresses. As described above, IP address allocation records include a range of IP addresses and contact information. The underlying assumptions upon which the behavior of resolver 106 is based are that IP addresses are allocated in blocks having relatively large IP address ranges and that the blocks of IP addresses are subsequently subdivided into blocks having smaller IP address ranges. It is assumed that consolidation of blocks of smaller IP address ranges into fewer blocks with larger IP address ranges is very rare. Accordingly, the IP address allocation record corresponding to the smallest range of IP addresses is most likely the most current and most likely reflects all subdivisions of IP addresses to date.

In step 320 (FIG. 3), resolver 106 (FIG. 1) retrieves the contact information for the IP allocation record corresponding to the smallest range of IP addresses. As described above, the contact information includes information pertaining to contacting a person or organization to whom the IP address is allocated and typically includes, for example, a mailing address and a telephone number. In step 322 (FIG. 3), resolver 106 (FIG. 1) parses data specify a geopolitical location from the mailing address of the contact. In this illustrative embodiment, the geopolitical territories of interest are countries and resolver 106 parses the country from the mailing address of the contact information in step 322 (FIG. 3). After step 322, processing according to logic flow diagram 300 completes and the country parsed in step 322 is returned as the resolved geopolitical location of the subject IP address.

In an alternative embodiment described more completely below, geopolitical location of the subject IP address is determined from a number of sources and a level of confidence is measured from the various sources and the degree of agreement between the sources. However, in this illustrative embodiment, location of an IP address allocation record in allocation databases 110 (FIG. 1) and 114 is deemed sufficient and conclusive.

As described above, resolver 106 determines the geopolitical location of client computer 160 according to a custom domain name of client computer 160 in step 306 (FIG. 3) if no IP address allocation record for the subject IP address is found in allocation databases 110 (FIG. 1) and 114. Step 306 (FIG. 3) is shown in greater detail as logic flow diagram 306 (FIG. 4).

In step 402, resolver 106 (FIG. 1) retrieves a domain name corresponding to the subject IP address from DNS database 116 using a conventional reverse DNS query. In general, a domain name is a custom name which includes alphanumeric characters which are generally more meaningful and easier to remember than normal numerical IP addresses. DNS database 116 is a conventional domain name server database, and reverse DNS queries are conventional and known.

In step 404 (FIG. 4), resolver 106 (FIG. 1) parses the last field of the domain name. Domain names generally have a number of textual fields delimited by periods, commonly referred to as "dot." For example, the domain name for the World Wide Web server for the United States Patent and Trademark Office is "www.uspto.gov" in which three fields are "www," "uspto," and "gov." The fields typically have a hierarchy such that each field is a subclassification of a domain name which follows. For example, "www.uspto.gov" is a subclassification of "uspto.gov." Accordingly, the last field of a domain name specifies a superclassification which can designate a geopolitical territory.

In test step 406 (FIG. 4), resolver 106 (FIG. 1) determines whether the last field of the domain name specifies a geopolitical territory. Many domain names include as the last field a two-letter country identifier. For example, ".us" specifies the United States, ".ca" specifies Canada, ".jp" specifies Japan, etc. If the last domain name field designates a geopolitical territory, processing transfers to test step 408 (FIG. 4) in which resolver 106 (FIG. 1) determines whether the geopolitical territory is satisfactorily specified. In one embodiment, resolver 106 makes such a determination by attributing a level of confidence in the designated geopolitical territory according to the designated geopolitical territory. For example, one country might carefully control and ensure that all domain names allocated to that country, i.e., all domain names having the two-letter country identifier for that country, are used within its territorial boundaries. Conversely, other countries might rather routinely sell domain names to interests outside their territorial boundaries. In the former case, a high degree of confidence is attributed to the country identified by the last field of the domain name, e.g., 90–95% confidence. In the latter case, a lower, unsatisfactory degree of confidence is attributed to the country identified by the last field of the domain name, e.g., 70% confidence. Resolver 106 determines whether the geopolitical territory is satisfactorily determined by comparison of the confidence level to a predetermined confidence threshold, e.g., 89%. The confidence level is expressed as an estimated likelihood of accuracy in this illustrative embodiment.

If the determined geopolitical territory has been satisfactorily determined, the determined geopolitical territory is returned in step 410 (FIG. 4) as the determined geopolitical territory and processing according to logic flow diagram 306, and therefore step 306 (FIG. 3), completes. Otherwise, processing transfers to test step 412 (FIG. 4). In addition, if the last field of the domain name does not specify a geopolitical territory, processing transfers directly from test step 406 to test step 412.

In test step 412, resolver 106 (FIG. 1) determines whether the last domain name field specifies any of a number of super-classifications that belong exclusively to the United States, e.g., ".gov," ".mil," ".arpa," and ".edu" which specify super-classifications of government, military, Advanced Research Projects Agency, and education, respectively. If so, the geopolitical territory is determined to be the United States and a degree of confidence is determined according to the particular super-classification. Super-classifications ".gov," ".mil," and ".arpa" are each associated with a 95% degree of confidence in this illustrative embodiment. If the last domain name field specifies any of the predetermined super-classes, processing transfers to test step 408 (FIG. 4) in which resolver 106 (FIG. 1) determines whether the geopolitical territory is satisfactorily specified, e.g., by comparison of the degree of confidence associated with the matched last domain name field with the predetermined confidence threshold, e.g., 89%.

If the associated degree of confidence indicates that the United States is satisfactorily determined to be the determined geopolitical territory, the United States is returned in step 414 (FIG. 4) as the determined geopolitical territory and processing according to logic flow diagram 306, and therefore step 306 (FIG. 3), completes. Otherwise, processing transfers to test step 418 (FIG. 4). In addition, if the last field of the domain name does not specify any of the predetermined super-classifications, processing transfers directly from test step 412 to test step 418.

In test step 418, resolver 106 (FIG. 1) determines whether the domain name of the subject IP address fits a pattern for which ad hoc parsing is appropriate. If so, the geopolitical territory of the subject IP address is determined according to ad hoc parsing in step 420 (FIG. 4). Such ad hoc parsing and the manner in which resolver 106 (FIG. 1) determines whether ad hoc parsing is appropriate is described below in greater detail. If ad hoc parsing is not appropriate, resolver 106 retrieves contact information for the domain name from INTERNIC database 112.

INTERNIC database 112 stores information regarding domain names, including contact information for the entity to whom each domain is allocated. Retrieval of such contact information for a particular domain name is known and conventional. In step 424 (FIG. 4), resolver 106 (FIG. 1) parses geopolitical territory information from the retrieved contact information in the manner described above with respect to step 322 (FIG. 3) and more completely below.

Regardless of whether ad hoc parsing is appropriate, processing transfers to test step 426 (FIG. 4) from either step 420 or step 424. In test step 426, resolver 106 (FIG. 1) determines whether a geopolitical territory has been satisfactorily determined. Such a determination is made by comparison of an accumulated degree of confidence to the predetermined confidence threshold. The manner in which a degree of confidence is accumulated is described below in greater detail. If the geopolitical territory is satisfactorily determined, the geopolitical territory is returned as the determined geopolitical territory of the subject IP address in step 428 (FIG. 4). In addition, a record associating the determined geopolitical territory with the subject IP address is stored in domain cache 108 (FIG. 1) for subsequent reference in step 430 (FIG. 4).

Conversely, if a geopolitical territory has not been satisfactorily determined, data specifying that the geopolitical territory of the subject IP address is unknown is returned by resolver 106 (FIG. 1) in step 432 (FIG. 4). In one embodiment, resolver 106 (FIG. 1) also spawns a trace routing process in step 434 (FIG. 4). The trace routing process uses conventional trace routing to determine the approximate geographical position of client computer 160 (FIG. 1) and maps that geographical position to determine a geopolitical territory within which client computer 160 exists. The trace routing process is spawned such that the process executes independently of, and asynchronously with, resolver 106. When the trace routing process completes, the determined geopolitical territory associated with the subject IP address is stored in IP address block cache 104 in the manner described more completely below for subsequent reference.

After either steps 428–430 (FIG. 4) or steps 432–434, processing according to logic flow diagram 306, and therefore step 306 (FIG. 3), completes. Thus, according to logic flow diagram 300, resolver 106 (FIG. 1) determines within which geopolitical territory the subject IP address is located. In one embodiment, resolver 106 stores the domain name and determined geopolitical location in a domain name cache 108 after step 428 (FIG. 4) and checks domain name cache 108 (FIG. 1) for previously resolved domain names prior to proceeding with steps 404–432 (FIG. 4). Domain names and associated geopolitical locations stored within domain cache 108 (FIG. 1) expire after a predetermined period of time, e.g., thirty (30) days.

Cache Updating

As described above with respect to steps 212 (FIG. 2) and 220, resolver 106 (FIG. 1) stores the geopolitical territory of the subject IP address in IP address block cache 104 when such a geopolitical territory is satisfactorily determined. As described briefly above, allocation databases 110 and 114 return ranges of IP addresses which are allocated as blocks. IP address block cache 104 stores IPABC records, e.g., IPABC record 1102 (FIG. 11), which represent ranges of IP addresses. However, determining a geopolitical territory from a domain name determines the geopolitical territory for a single IP address. In such instances, the range of addresses represented by IPABC record 1102 is a single IP address.

As described above, smaller IP address blocks are associated with greater accuracy and currency in IP address block cache 104. Accordingly, in this illustrative embodiment, TR server 100 divides IP address blocks, which are retrieved from allocation databases 110 and 114 and which exceed a predetermined size limit, into smaller IP address blocks. In particular, resolver 106 divides IP address blocks which exceed 512 IP addresses into multiple IP address blocks of no more than 256 IP addresses. In general, IP addresses are in the form of four numerical fields delimited by periods, i.e., dots. 127.56.214.9 is an example of an IP address. Each of the numerical fields has a value between zero and 255. Resolver 106 forms the smaller, subdivided IP address blocks by grouping all IP addresses which share the same first three numerical fields. For example, in this illustrative embodiment, resolver 106 divides an IP address range which begins with 127.56.212.0 and ends with 127.56.214.255 into three smaller IP address ranges, namely, 127.56.212.*, 127.56.213.*, and 127.56.214.* wherein the asterisk represents a wildcard and can represent any valid value, e.g., between 0 and 255.

Figure 11:
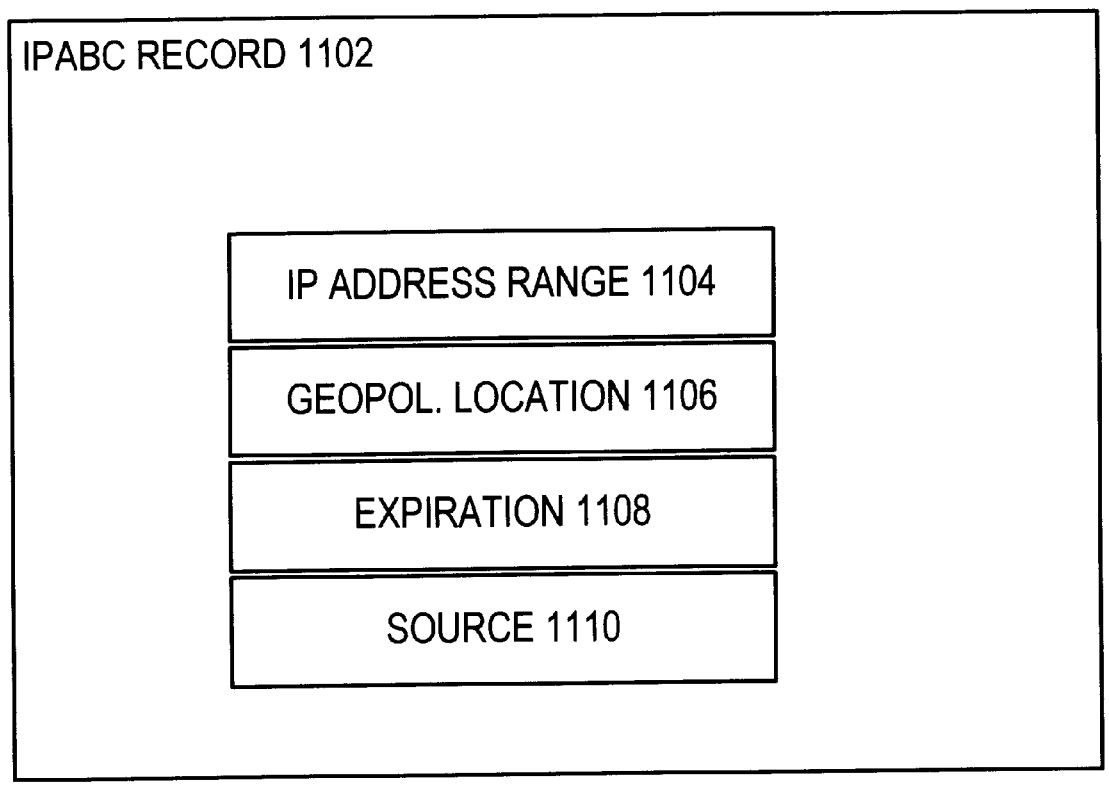
FIG. 11 is a block diagram of an IP address block record.

Resolver 106 forms an IPABC record, e.g., IPABC record 1102 (FIG. 11) to associate the subject IP address with the recently determined geopolitical territory within which the subject IP address is located. Specifically, resolver 106 (FIG. 1) stores data representing the current IP address range, i.e., that IP address range retrieved from allocation databases 110 and 114, or the range as limited in the manner described above, as IP address range 1104 (FIG. 11). Resolver 106 (FIG. 1) stores data representing the determined geopolitical territory as geopolitical location 1106 (FIG. 11). In addition, resolver 106 (FIG. 1) stores data specifying an expiration time as expiration time 1108 and data identifying the source of the determined geopolitical territory as source 1110. In one embodiment, the expiration time is thirty (30) days from the current time and source 1110 identifies resolver 106 (FIG. 1) as the source of IPABC record 1102 (FIG. 11). Other potential sources for IPABC records such as IPABC records include, for example, a human operator who specifies data to be stored in the various fields of IPABC record 1102 (FIG. 11) using conventional user interface techniques. In this illustrative embodiment, resolver 106 only replaces IPABC records in IP address block cache 104 for which resolver 106 is the source so as to prevent superseding geopolitical location information which is the result of manual investigation and evaluation by a human operator.

Figure 5:
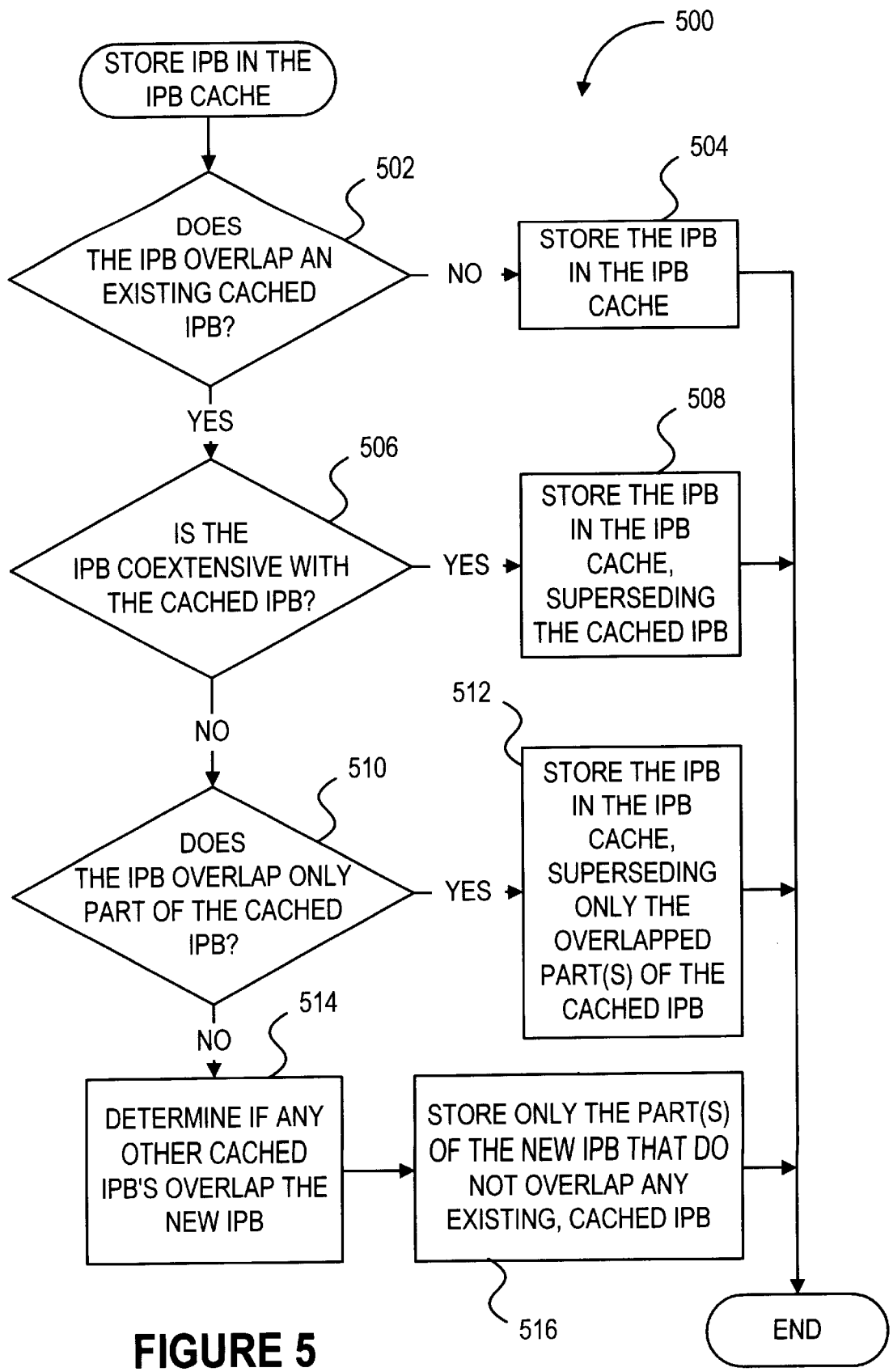
FIG. 5 is a logic flow diagram illustrating a portion of the processing by the territorial restriction server of FIG. 1 in greater detail.

In storing IPABC record 1102 (FIG. 11) into IP address block cache 104 (FIG. 1), resolver 106 takes care not to over-write current information already stored in IP address block cache 104 while ensuring that obsolete information is superseded. Storage of IPABC record 1102 (FIG. 11) into IP address block cache 104 (FIG. 1) by resolver 106 is illustrated by logic flow diagram 500 (FIG. 5).

In test step 502, resolver 106 (FIG. 1) determines whether IPABC record 1102 (FIG. 11) overlaps an IPABC record already stored in IP address block cache 104 (FIG. 1), i.e., whether the two IPABC records specify IP address ranges which share any IP addresses. If not, resolver 106 stores IPABC record 1102 (FIG. 11) in IP address block cache 104 (FIG. 1) in step 504 (FIG. 5) and processing according to logic flow diagram 500 completes.

Conversely, if the IPABC records overlap, processing transfers to test step 506 in which resolver 106 (FIG. 1) determines whether the IPABC records specify coextensive IP address blocks. If so, resolver 106 stores IPABC record 1102 (FIG. 11) in IP address block cache 104 (1), superseding the previously stored IPABC record corresponding to a coextensive range of IP addresses in step 508 (FIG. 5) and processing according to logic flow diagram 500 completes.

Conversely, if the IPABC records overlap but do not specify coextensive ranges of IP addresses, processing transfers to test step 510 in which resolver 106 (FIG. 1) determines whether IPABC record 1102 (FIG. 11) overlaps only a part of the previously stored IPABC record of IP address block cache 104 (FIG. 1), i.e., that the previously stored IPABC record specifies an IP address range which includes an IP address not included of the range of IP addresses of IPABC record 1102 (FIG. 11). If so, resolver 106 (FIG. 1) stores IPABC record 1102 in IP address block cache 104, superseding only those portions of the previously stored IPABC record which include IP addresses included in IP address range 1104 (FIG. 11) of IPABC record 1102 in step 512 (FIG. 5). In other words, resolver 106 (FIG. 1) modifies the previously stored IPABC record to exclude the IP addresses included in range of IP addresses 1104 (FIG. 11), dividing the modified, previously stored IPABC record into two IPABC records if necessary, i.e., if the addresses not included in range of IP addresses 1104 are not a single contiguous range of IP addresses. The underlying assumption by resolver 106 (FIG. 1) is that the range of IP addresses of the previously stored IPABC record has since been subdivided to produce a smaller range of IP addresses, namely, the range of IP addresses of IPABC record 1102 (FIG. 11). Accordingly, those addresses of the previously stored IPABC record should be superseded. However, the remaining addresses of the previously stored IPABC address should not be superseded until additional information regarding those IP addresses is subsequently discovered by resolver 106 (FIG. 1). After step 512 (FIG. 5), processing according to logic flow diagram 500 completes.

Conversely, if IPABC record 1102 (FIG. 11) overlaps the entirety of the previously stored IPABC record of IP address block cache 104 (FIG. 1), i.e., if every IP address specified by the previously stored IPABC record is included of the range of IP addresses of IPABC record 1102 (FIG. 11), processing transfers from test step 510 (FIG. 5) to step 514. At this point, resolver 106 (FIG. 1) has determined that IPABC record 1102 (FIG. 11) specifies an IP address range which includes every IP address in the range of IP addresses of the previously stored IPABC record and includes IP addresses not included in the range of IP addresses of the previously stored IPABC record since the IPABC records are not coextensive as determined above with respect to test step 506 (FIG. 5). Therefore, resolver 106 (FIG. 1) assumes that the previously stored IPABC record is a more recent subdivision of IP address range 1104 (FIG. 11) of IPABC record 1102 which is presumed to be an earlier allocated range of IP addresses. Accordingly, resolver 106 (FIG. 1) identities any other IPABC records of IP address block cache 104 which also represent ranges of IP address which overlap range of IP addresses 1104 (FIG. 11) in step 514 (FIG. 5). Resolver 106 (FIG. 1) assumes that these other previously stored IPABC records also represent more recent subdivisions of range of IP addresses 1104. Accordingly, in step 516 (FIG. 5), resolver 106 (FIG. 1) stores IPABC records representing only those portions of range of IP addresses 1104 (FIG. 11) which do not overlap IP address ranges of any previously stored IPABC records in IP address block cache 104 (FIG. 1), creating multiple IPABC records if the non-overlapping portions of range of IP addresses 1104 (FIG. 11) are not contiguous. After step 516 (FIG. 5), processing according to logic flow diagram 500 completes.

Thus, according to logic flow diagram 500, the geopolitical location of a range of IP addresses is stored in IP address block cache 104 (FIG. 1) in a manner which maximizes the accuracy of cached geopolitical locations. In general, it is preferred that records in a cache are consolidated to save storage resources and to facilitate efficient searching. However, in accordance with logic flow diagram 500 (FIG. 5), records are not consolidated, perhaps at the expense of additional required storage resources and less efficient searching because of the manner in which IP addresses are allocated and subdivided. In particular, accuracy and greater IP address range resolution are more important in IP address block cache 104 (FIG. 1) are more important than storage resources and searching efficiency. However, it is appreciated that storage resources should be saved and searching efficiency should be facilitated to the extent such can be accomplished without sacrificing accuracy and resolution in IP address block cache 104.

Parsing a Geopolitical Territory from Contact Information

As described above with respect to steps 322 (FIG. 3) and 424 (FIG. 4), resolver 106 (FIG. 1) parses a geopolitical territory designation from contact information. In this illustrative embodiment, the geopolitical territories are countries and are parsed from contact postal addresses. Parsing of a country designation in a postal address by resolver 106 is shown as logic flow diagram 1200 (FIG. 12) in which processing begins with step 1202.

In step 1202, resolver 106 (FIG. 1) looks for a country designation in the postal address according to an international pattern. For example, resolver 106 uses the following egrep pattern to detect a country designation.

'\s*([a-zA-Z\.\s]+)\n$'

The regular expression language, egrep, is known and conventional. Thus, according to the pattern above, a country is designated in a postal address fitting the international pattern by a line which includes nothing other than one or more characters belonging to a set which in turn includes the letters of the alphabet, a space character, and a period. If such a line is found, resolver 106 maps the contents of the line to one of a number of country designators. The relationship is many to one since each country can be specified in any of a number of ways. For example, the United States can be specified as any of the following: U.S.A., U.S., US, USA, United States, United States of America, America, and upper- and lower-case equivalents. In addition, Great Britain can be specified as Great Britain, England, the United Kingdom, G.B., U.K., and upper- and lower-case equivalents.

Figure 12:
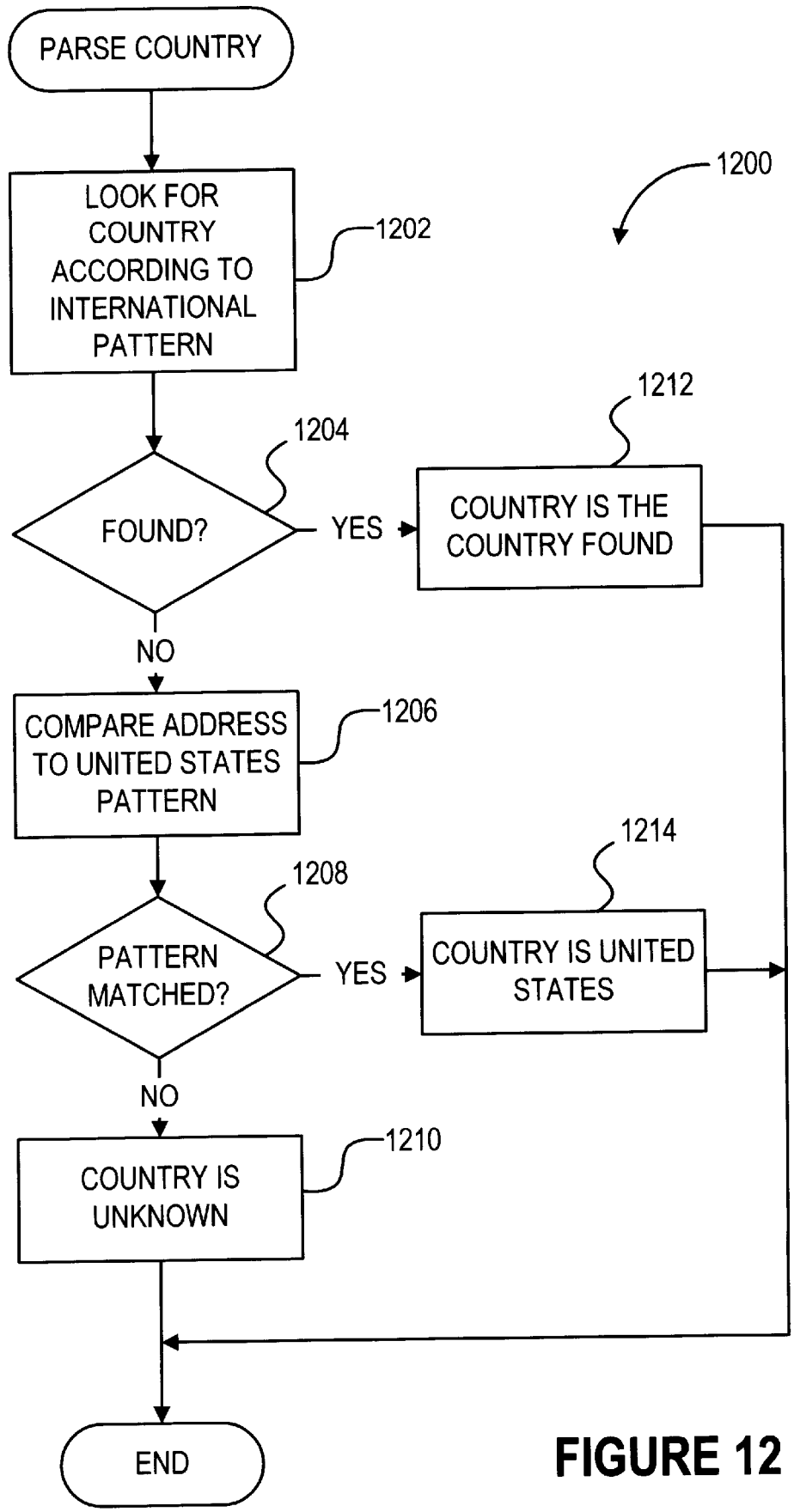
FIG. 12 is a logic flow diagram illustrating the parsing of country specification information from contact information by the territorial restriction server of FIG. 1.

In test step 1204 (FIG. 12), resolver 106 (FIG. 1) determines whether a country designator was successfully parsed from the postal address. If so, processing according to logic flow diagram 1200 completes. Otherwise, resolver 106 whether the postal address matches a United States pattern in step 1206 (FIG. 12). For example, resolver 106 (FIG. 1) uses the following egrep pattern to detect a country designation.

'[0-9a-zA-Z\.\s\-,]*,?/s[\.\sA-Za-z]+,?\.?\s+[0-9\-]+'

Thus, a United States postal address is generally a street address in the form of a number of numerals, letters, spaces, periods, and commas followed by a state designation in the form of a number of letters, spaces and periods followed in turn by a zip code in the form of a number of numerals. If the postal address matches the United States pattern, resolver 106 has successfully determined that the postal address is a United States address and processing according to logic flow diagram 1200 (FIG. 12) completes. Conversely, if the postal address does not match the United States pattern, processing transfers to step 1210 in which resolver 106 (FIG. 1) has failed to parse the country from the postal address and the geopolitical territory specified by the contact information is designated as unknown. After step 1210 (FIG. 12), processing according to logic flow diagram 1200 completes.

Ad Hoc Parsing

Figure 13:
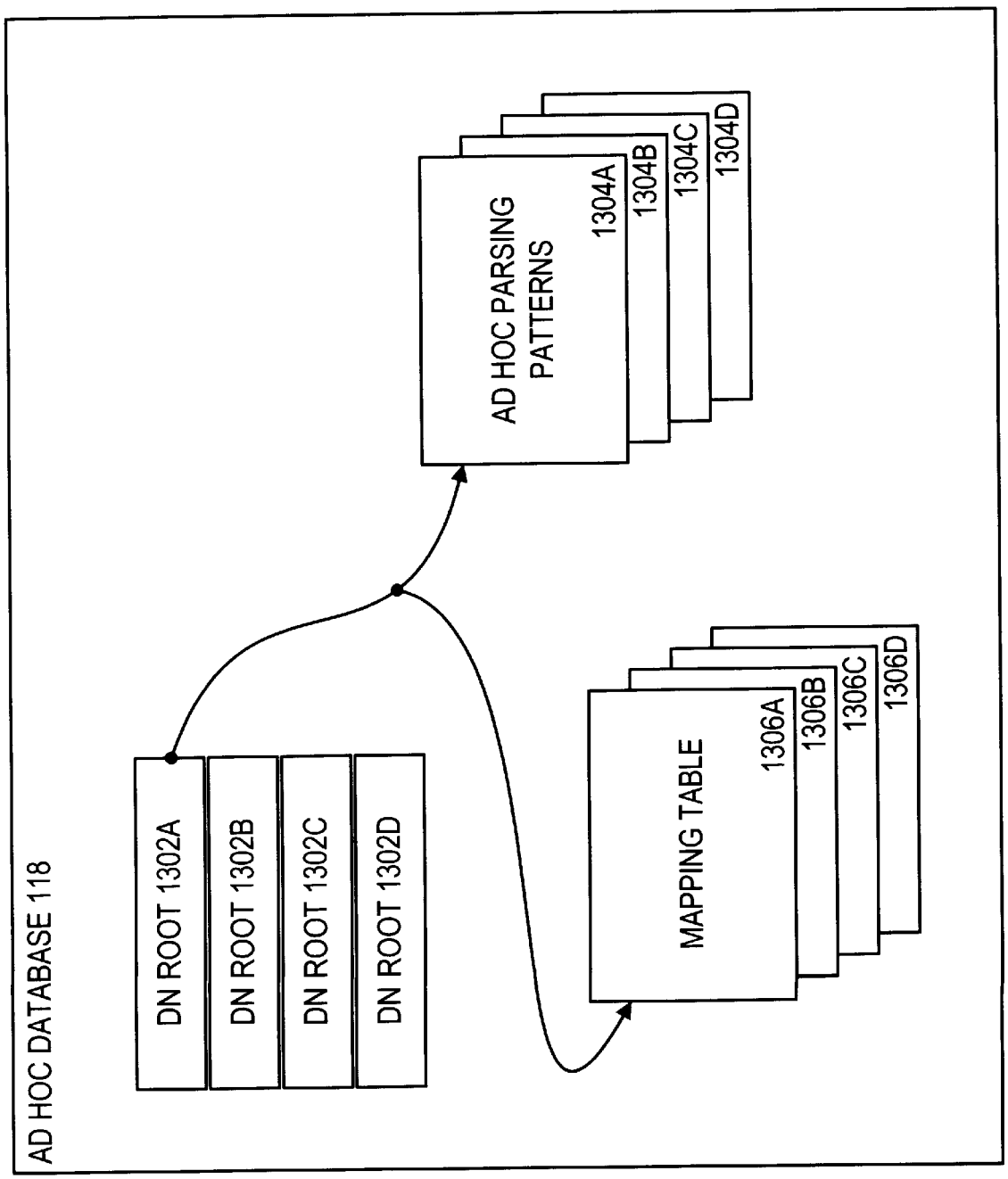
FIG. 13 is a block diagram of an ad hoc parsing database of the territorial restriction server of FIG. 1.

As described briefly above with respect to step 420 (FIG. 4), resolver 106 (FIG. 1) determines geopolitical locations for some domain names according to ad hoc parsing. First, resolver 106 determines whether ad hoc parsing is appropriate by comparing a root of the subject domain name to a number of domain name roots 1302A–D (FIG. 13) of ad hoc database 118 (FIGS. 13 and 1). The subject domain name is the domain name returned from DNS database 116 in the reverse DNS query of step 402 (FIG. 4). A root domain name is a domain name with only the one most-significant field which is not used as a super-classification specification. For example, the domain name "slip22-12-10.pa.fr.ibm.net" has the root domain name of "ibm.net" since ".net" specifies a super-classification of "network." Similarly, "www.tl.domain.co.uk" has the root domain name of "domain.co.uk" since ".uk" specifies the super-classification of the United Kingdom and ".co" specifies the super-classification of "commercial."

If the root of the subject domain name does not match any of the root domain names 1302A–D (FIG. 13), ad hoc parsing is not appropriate and processing transfers from test step 418 (FIG. 4) to step 422 in the manner described above. Conversely, if the root of the subject domain name matches one of root domain names 1302A–D (FIG. 13), e.g., root domain name 1302A, a corresponding one of ad hoc parsing patterns 1304A–D, e.g., ad hoc parsing pattern 1304A, specifies the manner in which country designation is parsed from the domain name. Of course, the nature of ad hoc parsing requires that the specific pattern be devised to properly parse the subject domain name according to the particular convention self-imposed by the owner of the root domain name. The conventions so self-imposed are discovered simply by evaluation of previously resolved and other domain names and pattern recognition, e.g., by a human computer systems engineer. The following example is illustrative.

In this example, the subject domain name is "slip22-12-10.pa.fr.ibm.net" and the corresponding pattern, e.g., specified by ad hoc parsing pattern 1304A, is as follows:

"slip\d{1,3}-\d{1,3}-\d{1,3}.\w\w.(\w\w) "

The above pattern specifies that the domain name consists of the following elements: (i) "slip";(ii) between one and three numerical digits; (iii) a hyphen; (iv) between one and three numerical digits; (v) a hyphen; (Vi) between one and three numerical digits; (vii) a hyphen; (viii) a period (dot), (ix) two alpha-numeric characters; (x) a period (dot); and two alpha-numeric characters which are stored as the result of ad hoc parsing according to ad hoc parsing pattern 1304A. In the example above, "slip22-12-10.pa.fr.ibm.net" matches the pattern and the stored result of the parsing are the two alpha-numeric characters "fr" which is the country code for France.

Figure 14A:
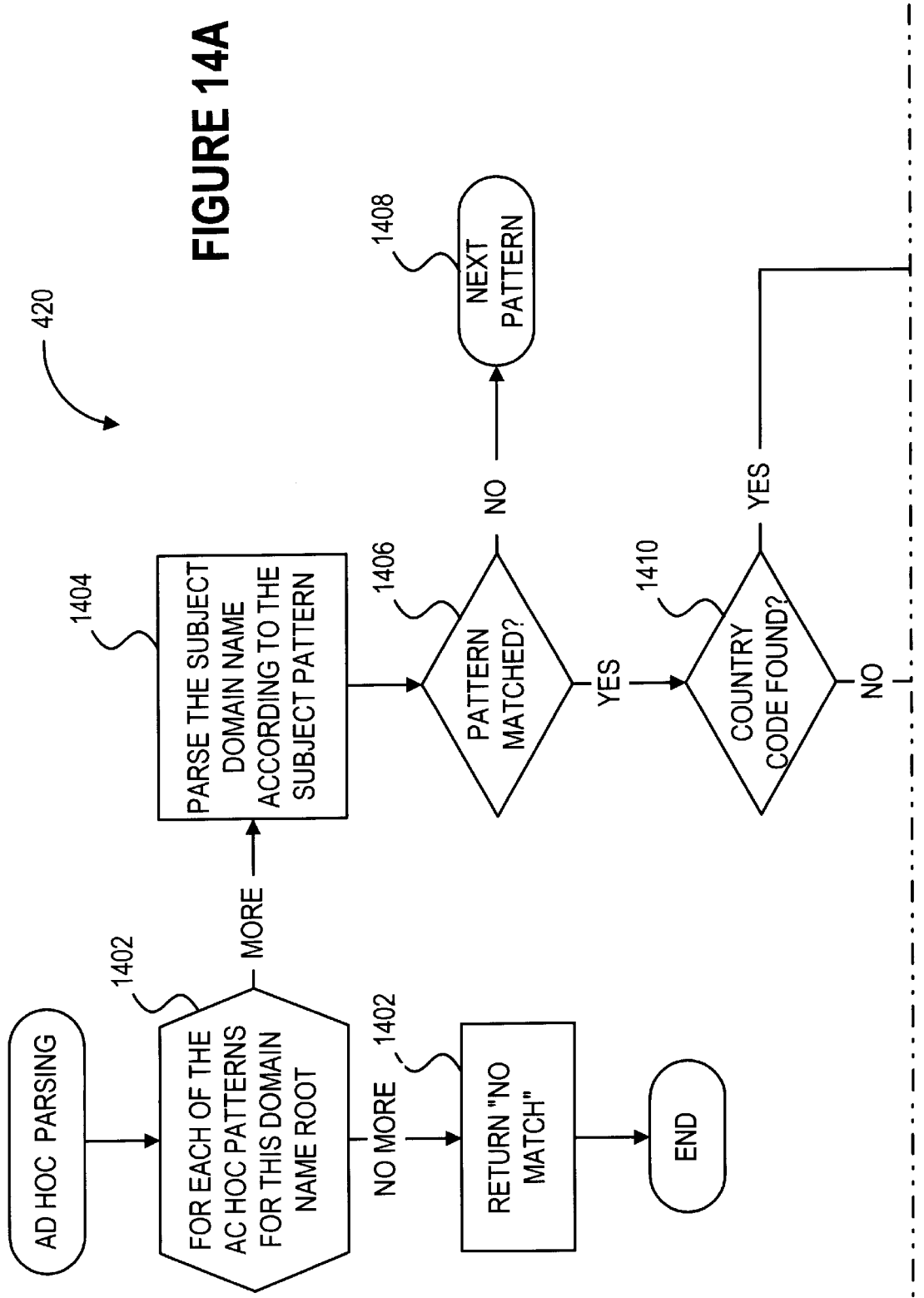
FIG. 14 is a logic flow diagram of ad hoc parsing in accordance with the present invention by the territorial restriction server of FIG. 1.

Each of ad hoc patterns 1304A–D can include more than one pattern. Ad hoc parsing by resolver 106 (FIG. 1) is shown in greater detail as logic flow diagram 420 (FIG. 14). Loop step 1402 and next step 1408 define a loop in which each of the one or more ad hoc patterns 1304A (FIG. 13) is processed according to steps 1404–1406 (FIG. 14) and, if a pattern is matched, steps 1410–1420. During each iteration of the loop of steps 1402–1408, the one of ad hoc patterns 1304A (FIG. 13) processed by resolver 106 is referred to as the subject pattern. The domain name returned by the reverse DNS query described above, and processed by resolver 106 (FIG. 1) according to logic flow diagram 420 (FIG. 14), is referred to as the subject domain name.

In step 1404, resolver 106 (FIG. 1) parses the subject domain name according to the subject pattern. If the subject domain name does not match the subject pattern, processing transfers through test step 1406 (FIG. 14) and next step 1408 to loop step 1402 in which the next of ad hoc patterns 1304A (FIG. 13) is processed according to the loop of steps 1402–1408 (FIG. 14). Conversely, if the subject domain name matches the subject pattern, processing transfers through test step 1406 to test step 1410 in which resolver 106 (FIG. 1) determines whether the stored result of parsing according to step 1404 (FIG. 14) is a country code as recognized by resolver 106 (FIG. 1). In one embodiment, resolver 106 recognizes the same country codes used in standard country designations in conventional domain names as detected in test step 406 (FIG. 4) described above. If the stored result of parsing is a recognized country code, processing transfers to step 1412 (FIG. 14) in which a match is determined by resolver 106 (FIG. 1) and the country is that specified by the recognized country code. Otherwise, processing transfers to step 1414 (FIG. 14).

In step 1414, resolver 106 (FIG. 1) maps the stored parsing result using mapping table 1306A (FIG. 13), which corresponds to the one of domain name roots 1302A–D which matches the subject domain name, e.g., domain name root 1302A. Mapping table 1306A maps data identifying various countries as used within the corresponding ad hoc patterns to country designations recognized by resolver 106 (FIG. 1). In test step 1416 (FIG. 14), resolver 106 (FIG. 1) determines whether the resulting country code mapped by use of mapping table 1306A (FIG. 13) is a recognized country code. If so, processing transfers to step 1412 (FIG. 14) in which a match is determined by resolver 106 (FIG. 1) and the country is that specified by the recognized country code. Otherwise, processing transfers to step 1418 (FIG. 14).

In step 1418, resolver 106 (FIG. 1) logs the failure to map to a recognized country code for subsequent investigation and potential correction to ad hoc patterns 1304A (FIG. 13) and/or mapping table 1306A. In step 1420 (FIG. 14), resolver 106 (FIG. 1) determines that parsing of the subject domain name by ad hoc patterns 1304A (FIG. 13) has resulted in no country determination and the county of the subject domain name is unknown.

After either step 1412 or step 1420, processing according to logic flow diagram 420, and therefore step 420 (FIG. 4) completes.

Access Based Upon Geopolitical Territory

As described briefly above, server computer 150 (FIG. 1) sends data to client computer 160 depending upon the geopolitical territory within which client computer 160 is located. Server computer 150 is shown in greater detail in FIG. 6. Server computer 150 includes content 602 which includes a digital product which can be requested by any of client computers 160–164. Content 602 can include a territorial restriction 604 which specifies one or more geopolitical territories to which content 602 can be delivered. The one or more geopolitical territories can include an "unknown" territory such that content 602 can be delivered to client computer whose geopolitical location cannot be satisfactorily determined.

Data, including content 602 and other digital products, are stored within server computer 150 according to one or more accounts, e.g., account 606. For example, account 606 can represent a particular provider of digital products whose digital products are stored within server computer 150. Account 606 can include a territorial restriction 608 which specifies one or more geopolitical territories to which data of account 606 can be delivered.

In addition, server computer 150 can include a territorial restriction 610 which specified one or more geopolitical territories to which server computer 150 is permitted to deliver data such as content 602.

Figure 7:
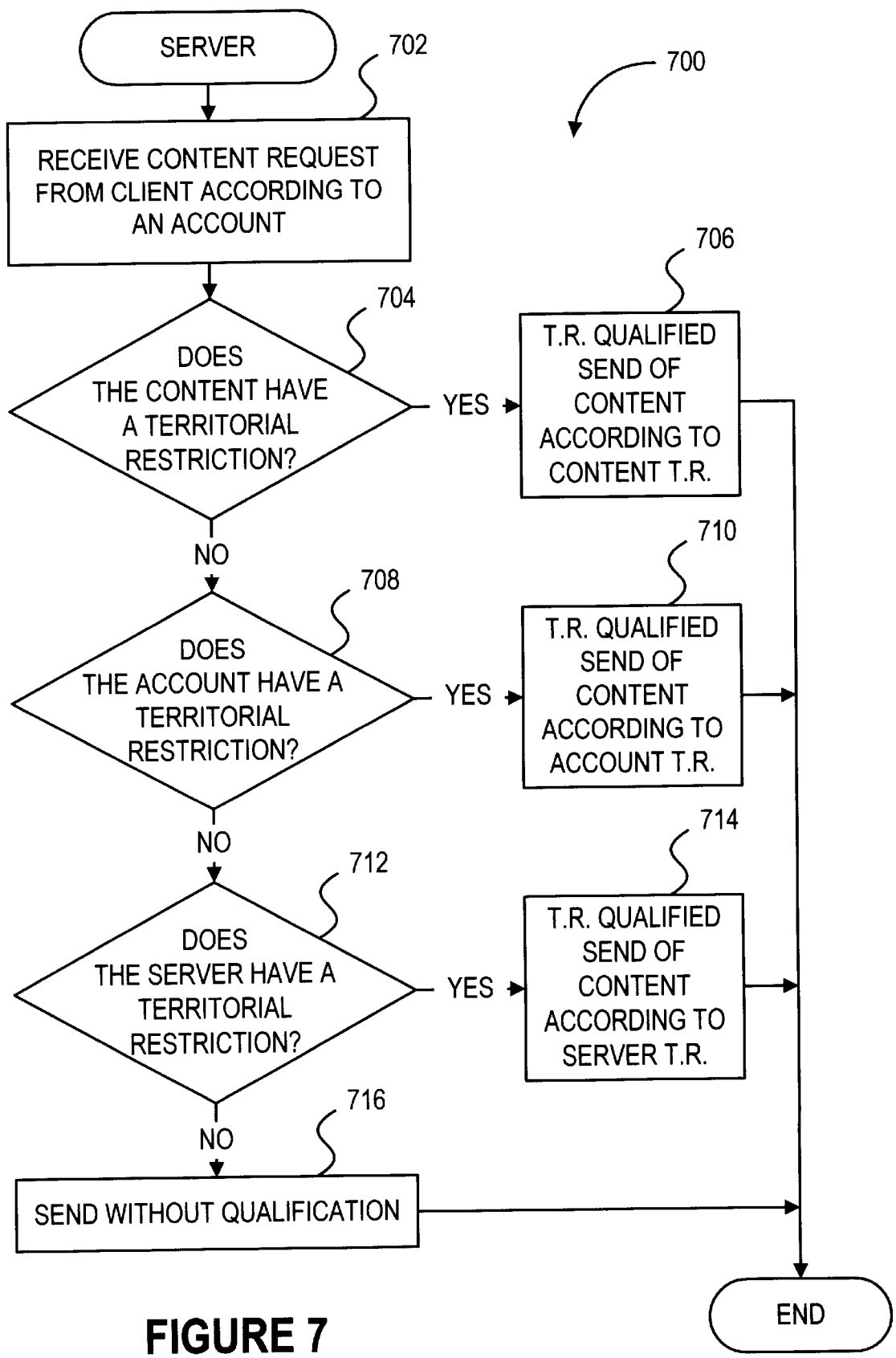
FIG. 7 is a logic flow diagram illustrating processing by the server of FIG. 6.

Processing by server computer 150 in response to a request for data from a client computer, e.g., client computer 160, is shown in logic flow diagram 700 (FIG. 7). In step 702, server computer 150 (FIG. 6) receives a request for data, e.g., content 602, which is associated with a particular account, e.g., account 606. In test step 704 (FIG. 7), server computer 150 (FIG. 6) determines whether the requested content, e.g., content 602, includes a territorial restriction. If so, server computer 150 performs a territorial restriction qualified send to client computer 160 of content 602 according to territorial restriction 604 of content 602 in step 706 as described more completely below. If the requested content does not include a territorial restriction, processing transfers from test step 704 to test step 708.

In test step 708 (FIG. 7), server computer 150 (FIG. 6) determines whether account 606 includes a territorial restriction. If so, server computer 150 performs a territorial restriction qualified send to client computer 160 of content 602 according to territorial restriction 608 of account 606 in step 710 (FIG. 7) as described more completely below. If account 606 (FIG. 6) does not include a territorial restriction, processing transfers from test step 708 (FIG. 7) to test step 712.

In test step 712, server computer 150 (FIG. 6) determines whether server computer 150 includes a territorial restriction which is applicable to all requests for server computer 150, e.g., territorial restriction 610. If so, server computer 150 performs a territorial restriction qualified send to client computer 160 of content 602 according to territorial restriction 610 of server computer 150 in step 714 (FIG. 7) as described more completely below. If server computer 150 (FIG. 6) does not include a territorial restriction, processing transfers from test step 712 (FIG. 7) to test step 716 in which server computer 150 (FIG. 6) sends the requested content without territorial qualification.

Figure 8:
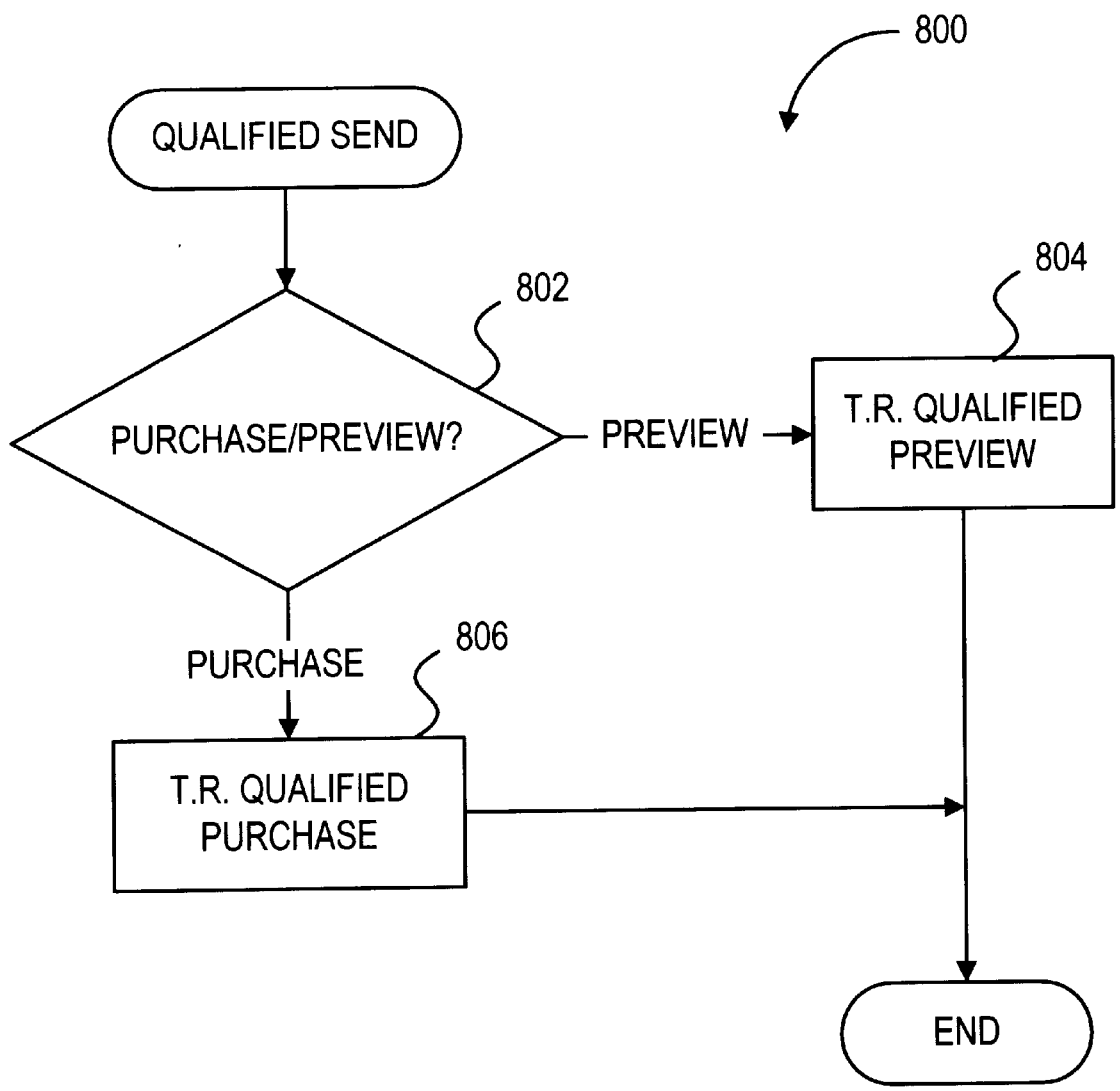
FIG. 8 is a logic flow diagram illustrating a portion of the processing by the server of FIG. 6 in greater detail.

Each of steps 706 (FIG. 7), 710, and 714 is represented in greater detail by logic flow diagram 800 (FIG. 8) in which content sending in conditioned upon a particular territorial restriction, i.e., territorial restrictions 604 (FIG. 6), 608, and 610, respectively. The particular territorial restriction is sometimes referred to as the subject territorial restriction.

In test step 802 (FIG. 8), server computer 150 (FIG. 6) determines whether the request for content 602 is a request for a preview or a request for a purchase of content 602. In this illustrative embodiment, as in many on-line commerce applications, a distinction is made between previews of data and purchases of digital products. The digital products can include, for example, computer software and/or data representing multimedia content such as digitized audio, graphical images, and motion video. In general, previewing such digital products generally ought to be quick and easy for the user while purchasing generally requires more effort from the user in supplying payment information, e.g, credit card information, through a secure connection. Accordingly, previews of content 602 and purchases of content 602 are processed differently. In one embodiment, purchasing of digital products through server computer 150 is performed in the manner described more completely in copending U.S. patent application Ser. No. 09/289,513 entitled "Secure Online Music Distribution System" by Philip R. Wiser, Andrew R. Cherenson, Steven T. Ansell, and Susan A. Cannon (hereinafter the Distribution Application) which is incorporated herein in its entirety by reference.

Figure 9:
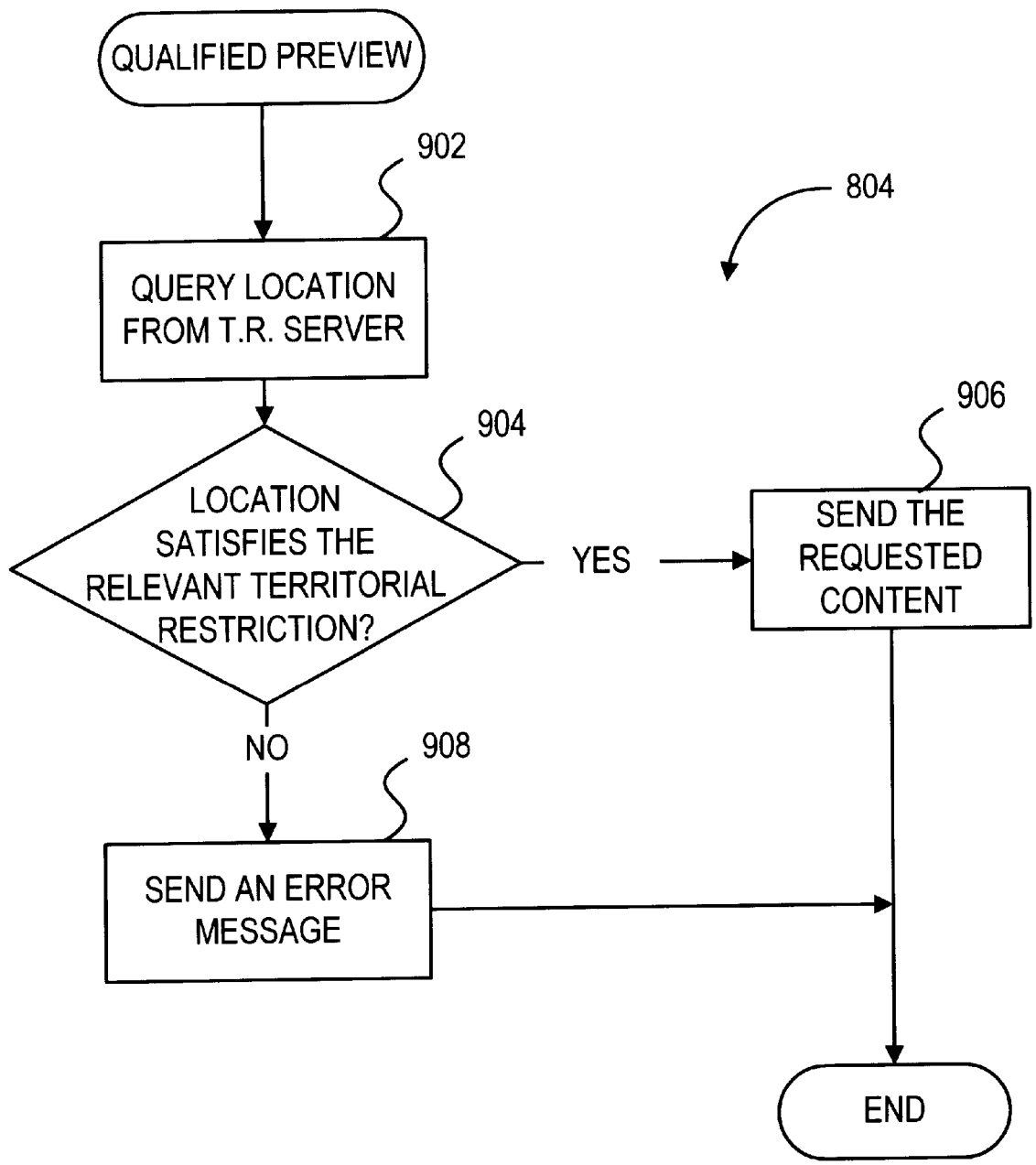
FIG. 9 is a logic flow diagram illustrating a portion of the processing by the server of FIG. 6 in greater detail.

If the requested access is for previewing content 602, processing transfers to step 804 which is shown in greater detail as logic flow diagram 804 (FIG. 9). Conversely, if the requested access is for purchasing content 602 (FIG. 6), processing transfers from test step 802 (FIG. 8) to step 806 which is shown in greater detail as logic flow diagram 806 (FIG. 10).

In processing a request for a preview of content 602 (FIG. 6), server computer 150 begins with step 902 (FIG. 9) in which server computer 150 (FIG. 6) queries the geopolitical location of the requesting client computer, e.g., client computer 160, from TR server 100 by supplying the IP address of the requesting client computer. The IP address is known since the requesting client computer must generally supply an address to which the requested content should be delivered. TR server 100 processes the request in the manner described above and returns data specifying a geopolitical territory within which the requesting client computer is determined to be located. In this illustrative embodiment, server computer 150 includes a IP address cache 152 which stores geopolitical locations for individual IP addresses as previously returned by TR server 100. Server computer 150 first retrieves geopolitical locations from IP address cache 152 before querying TR server 150. In this illustrative embodiment, server computer 150 queries TR server 100 only if no geopolitical location for the subject IP address is stored in IP address cache 152 or if the geopolitical location for the subject IP address has expired according to an expiration time stored with the geopolitical location.

In test step 904 (FIG. 9), server computer 150 (FIG. 6) compares the returned geopolitical territory of the requesting client computer with the geopolitical territories specified in the subject territorial restriction. If the determined geopolitical territory satisfies the territorial restriction, processing transfers to step 906 (FIG. 9) in which server computer 150 (FIG. 6) sends the requested content to the requesting client computer for previewing. Conversely, if the determined geopolitical territory does not satisfy the territorial restriction, processing transfers to step 908 (FIG. 9) in which server computer 150 (FIG. 6) sends to the requesting client computer an error message which indicates that the requested content is not available for previewing. After either of steps 906 (FIG. 9) and 908, processing according to logic flow diagram 804, and therefore step 804 (FIG. 8), completes.

Figure 10:
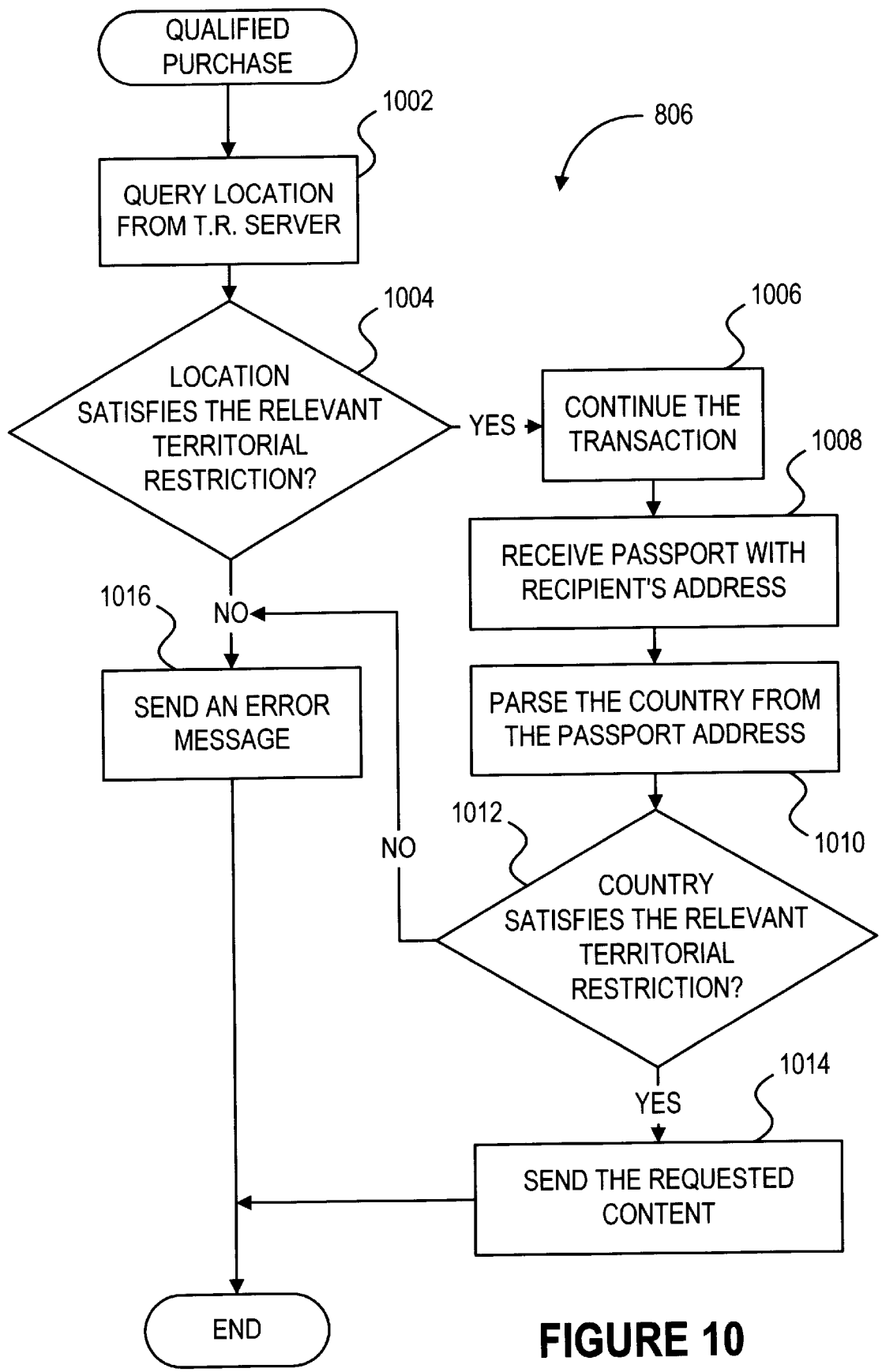
FIG. 10 is a logic flow diagram illustrating a portion of the processing by the server of FIG. 6 in greater detail.

A territorially qualified purchase of content 602 (FIG. 6) in step 806 (FIG. 8) is shown in greater detail as logic flow diagram 806 (FIG. 10). In step 1002, server computer 150 (FIG. 6) queries TR server 100 for the geopolitical location of the requesting client computer, e.g., client computer 160, in the manner described above with respect to step 902 (FIG. 9), including use of IP address cache 152 (FIG. 6). In test step 1004 (FIG. 10), server computer 150 (FIG. 6) determines whether the returned geopolitical location satisfies the subject territorial restriction. If not, server computer 150 sends an error message in step 1016 (FIG. 10) indicating that the requested content, e.g., content 602 (FIG. 6), cannot be delivered. Conversely, if the returned geopolitical location satisfies the subject territorial restriction, processing transfers to step 1006 (FIG. 10).

In step 1006, server computer 150 (FIG. 6) continues the transaction with the requesting client computer, e.g., client computer 160. In this illustrative embodiment, continuing the transaction involves supplying a passport to initiate delivery of the requested digital product. Passports are described more completely in the Distribution Application and that description is incorporated herein by reference. Separation of the purchase of a digital product from the delivery of the digital product as described in the Distribution Application enables one consumer to purchase a digital product which can be subsequently claimed by, and delivered to, a different consumer as a gift from the first consumer to the second. In steps 1004 (FIG. 10), 1006, and 1016, server computer 150 ensures that the purchaser is located in an authorized geopolitical territory. In addition, by checking in steps 1002–1004 prior to continuing the transaction, the user and recipient are saved the trouble and inconvenience of requesting final delivery of the requested digital product if the requested digital product is unavailable to that recipient. The trouble and inconvenience of providing a passport is reserved for situations in which the requested content is believed by server computer 150 to be available to the recipient. As described further below, the perceived availability of the requested content is preliminary and server computer 150 subsequently verifies the availability of the requested content.

Further in step 1006 (FIG. 10), server computer 150 (FIG. 6) receives the passport from the requesting client computer. The passport includes an address. The address stored in the passport is verified using conventional techniques such as verification through a credit card or other billing authority. According, the address of the passport is more reliable and more trusted than IP address allocation databases 110 and 114, DNS database 116, and INTERNIC database 112. Therefore, in step 1008 (FIG. 10), server computer 150 (FIG. 6) parses the country specification from the address in the passport in the manner described above with respect to logic flow diagram 1200 (FIG. 12).

In test step 1012 (FIG. 10), server computer 150 (FIG. 6) determines whether the parsed country specification satisfies the subject territorial restriction. If not, processing transfers to step 1016 (FIG. 10) in which an error message is sent in the manner described above. Conversely, if the parsed country specification satisfies the subject territorial restriction, processing transfers to step 1014 in which server computer 150 (FIG. 6) sends the requested content.

Thus, data representing digital products is selectively delivered according to the geopolitical territory within which the client computer requesting such data is located. Such permits territorial restriction of availability of such digital products for legal, marketing, or other reasons.

The above description is illustrative only and is not limiting. The present invention is limited only by the claims which follow.

What is claimed is:

1. A method for delivering a requested digital product to a client computer, the method comprising:
   (a) receiving a request to send the requested digital product to the client computer;
   (b) determining that a territorial restriction limits availability of the digital product to one or more allowed territories;
   (c) determining within which of one or more geographical territories the client computer is located by:
      determining a network address of the client computer;
      determining that a custom name is associated with the network address;
      parsing classification information which represents a classification from the custom name;
      determining that the classification is used primarily within a first of the geographical territories; and
      determining that the client computer is located within the first geographical territory; and
   (d) sending the requested digital product to the client computer upon a condition in which the one of the geographical territories in which the client computer is located is also one of the allowed territories.

2. The method of claim 1 wherein determining that the classification is used primarily within a first of the geographical territories comprises:
   estimating, from the classification, the likelihood that the client computer is located within the first geographical territory; and determining that the client computer is located within the first geographical territory if the likelihood is at least a predetermined threshold.

3. The method of claim 1 wherein the classification information is selected from a group consisting of ".mil," ".gov," and ".arpa"; and further wherein the first geographical territory is the United States.

4. A method for delivering a requested digital product to a client computer, the method comprising:
(a) receiving a request to send the requested digital product to the client computer;
(b) determining that a territorial restriction limits availability of the digital product to one or more allowed territories;
(c) determining within which of one or more geographical territories the client computer is located by:
determining a network address of the client computer;
determining that a custom name is associated with the network address;
selecting a pattern according to a root of the custom name;
determining whether the custom name matches the pattern; and
parsing data specifying one of the geographical territories from the custom name according to the pattern; and
(d) sending the requested digital product to the client computer upon a condition in which the one of the geographical territories in which the client computer is located is also one of the allowed territories.

5. A method for delivering a requested digital product to a client computer, the method comprising:
(a) receiving a request to send the requested digital product to the client computer;
(b) determining that a territorial restriction limits availability of the digital product to one or more allowed territories;
(c) determining within which of one or more geographical territories the client computer is located by:
determining a network address of the client computer;
determining that a custom name is associated with the network address;
retrieving owner information regarding an owner of the custom name; and
parsing data specifying one of the geographical territories from the owner information; and
(d) sending the requested digital product to the client computer upon a condition in which the one of the geographical territories in which the client computer is located is also one of the allowed territories.

6. A computer readable medium useful in association with a computer which includes a processor and a memory, the computer readable medium including computer instructions which are configured to cause the computer to deliver a requested digital product to a client computer by:
(a) receiving a request to send the requested digital product to the client computer;
(b) determining that a territorial restriction limits availability of the digital product to one or more allowed territories;
(c) determining within which of one or more geographical territories the client computer is located by:
determining a network address of the client computer;
determining that a custom name is associated with the network address;
parsing classification information which represents a classification from the custom name;
determining that the classification is used primarily within a first of the geographical territories; and
determining that the client computer is located within the first geographical territory; and
(d) sending the requested digital product to the client computer upon a condition in which the one of the geographical territories in which the client computer is located is also one of the allowed territories.

7. The computer readable medium of claim 6 wherein determining that the classification is used primarily within a first of the geographical territories comprises:
estimating, from the classification, the likelihood that the client computer is located within the first geographical territory; and
determining that the client computer is located within the first geographical territory if the likelihood is at least a predetermined threshold.

8. The computer readable medium of claim 6 wherein the classification information is selected from a group consisting of ".mil," ".gov," and ".arpa"; and further wherein the first geographical territory is the United States.

9. A computer readable medium useful in association with a computer which includes a processor and a memory, the computer readable medium including computer instructions which are configured to cause the computer to deliver a requested digital product to a client computer by:
(a) receiving a request to send the requested digital product to the client computer;
(b) determining that a territorial restriction limits availability of the digital product to one or more allowed territories;
(c) determining within which of one or more geographical territories the client computer is located by:
determining a network address of the client computer;
determining that a custom name is associated with the network address;
selecting a pattern according to a root of the custom name;
determining whether the custom name matches the pattern; and
parsing data specifying one of the geographical territories from the custom name according to the pattern; and
(d) sending the requested digital product to the client computer upon a condition in which the one of the geographical territories in which the client computer is located is also one of the allowed territories.

10. A computer readable medium useful in association with a computer which includes a processor and a memory, the computer readable medium including computer instructions which are configured to cause the computer to deliver a requested digital product to a client computer by:
(a) receiving a request to send the requested digital product to the client computer;
(b) determining that a territorial restriction limits availability of the digital product to one or more allowed territories;
(c) determining within which of one or more geographical territories the client computer is located by:
determining a network address of the client computer;
determining that a custom name is associated with the network address;

retrieving owner information regarding an owner of the custom name; and parsing data specifying one of the geographical territories from the owner information; and (d) sending the requested digital product to the client computer upon a condition in which the one of the geographical territories in which the client computer is located is also one of the allowed territories.

11. A computer system which delivers a requested digital product to a client computer by:

(a) receiving a request to send the requested digital product to the client computer;

(b) determining that a territorial restriction limits availability of the digital product to one or more allowed territories;

(c) determining within which of one or more geographical territories the client computer is located by:
determining a network address of the client computer;
determining that a custom name is associated with the network address;
parsing classification information which represents a classification from the custom name;
determining that the classification is used primarily within a first of the geographical territories; and
determining that the client computer is located within the first geographical territory; and (d) sending the requested digital product to the client computer upon a condition in which the one of the geographical territories in which the client computer is located is also one of the allowed territories.

12. The computer system of claim 11 wherein determining that the classification is used primarily within a first of the geographical territories comprises:

estimating, from the classification, the likelihood that the client computer is located within the first geographical territory; and determining that the client computer is located within the first geographical territory if the likelihood is at least a predetermined threshold.

13. The computer system of claim 11 wherein the classification information is selected from a group consisting of ".mil," ".gov," and ".arpa"; and further wherein the first geographical territory is the United States.

14. A computer system which delivers a requested digital product to a client computer by:

(a) receiving a request to send the requested digital product to the client computer;

(b) determining that a territorial restriction limits availability of the digital product to one or more allowed territories;

(c) determining within which of one or more geographical territories the client computer is located by:
determining a network address of the client computer;
determining that a custom name is associated with the network address;
selecting a pattern according to a root of the custom name;
determining whether the custom name matches the pattern; and
parsing data specifying one of the geographical territories from the custom name according to the pattern; and (d) sending the requested digital product to the client computer upon a condition in which the one of the geographical territories in which the client computer is located is also one of the allowed territories.

15. A computer system which delivers a requested digital product to a client computer by:

(a) receiving a request to send the requested digital product to the client computer;

(b) determining that a territorial restriction limits availability of the digital product to one or more allowed territories;

(c) determining within which of one or more geographical territories the client computer is located by:
determining a network address of the client computer;
determining that a custom name is associated with the network address;
retrieving owner information regarding an owner of the custom name; and
parsing data specifying one of the geographical territories from the owner information; and (d) sending the requested digital product to the client computer upon a condition in which the one of the geographical territories in which the client computer is located is also one of the allowed territories.

* * * * *